(12) United States Patent
Nihey et al.

(10) Patent No.: US 10,535,250 B2
(45) Date of Patent: Jan. 14, 2020

(54) EVACUATION GUIDANCE SYSTEM AND EVACUATION GUIDANCE METHOD

(71) Applicant: NEC Corporation, Tokyo (JP)

(72) Inventors: Fumiyuki Nihey, Tokyo (JP); Takashi Manako, Tokyo (JP); Hiroyuki Endoh, Tokyo (JP); Noriyuki Tonouchi, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/322,367

(22) PCT Filed: Aug. 1, 2017

(86) PCT No.: PCT/JP2017/027795
§ 371 (c)(1),
(2) Date: Jan. 31, 2019

(87) PCT Pub. No.: WO2018/025830
PCT Pub. Date: Feb. 8, 2018

(65) Prior Publication Data
US 2019/0172338 A1      Jun. 6, 2019

(30) Foreign Application Priority Data

Aug. 3, 2016  (JP) .................................. 2016-152623

(51) Int. Cl.
| | | |
|---|---|---|
| G08B 25/10 | (2006.01) | |
| G08B 17/00 | (2006.01) | |
| H04N 5/262 | (2006.01) | |
| G08B 27/00 | (2006.01) | |

(52) U.S. Cl.
CPC ............. *G08B 25/10* (2013.01); *G08B 17/00* (2013.01); *G08B 27/00* (2013.01); *H04N 5/262* (2013.01)

(58) Field of Classification Search
None
See application file for complete search history.

(56) References Cited

U.S. PATENT DOCUMENTS

| | | | | |
|---|---|---|---|---|
| 6,114,967 A | * | 9/2000 | Yousif .................... | G08B 17/00 200/61.45 R |
| 8,044,772 B1 | * | 10/2011 | Roe ....................... | B60K 28/06 180/272 |

(Continued)

FOREIGN PATENT DOCUMENTS

| | | |
|---|---|---|
| DE | 10 2004 057 000 B3 | 6/2006 |
| JP | 2003-196770 A | 7/2003 |

(Continued)

OTHER PUBLICATIONS

Written Opinion of the International Search Report of PCT/JP2017/027795 dated Oct. 24, 2017.

(Continued)

*Primary Examiner* — Chico A Foxx
(74) *Attorney, Agent, or Firm* — Sughrue Mion, PLLC

(57) ABSTRACT

In order to detect a behavioral state of an evacuee in a facility and provide, for an evacuee, an evacuation instruction according to the behavioral state, the present invention provides an evacuation guidance system including: a storage means; an analysis control means for acquiring pressure data generated by at least one pressure sensor installed on an evacuation route in a facility and storing the pressure data in the storage means, and also for comparing a plurality of pieces of the pressure data generated in a verification time period, analyzing a temporal change in the pressure data, and analyzing a state of a person located on the pressure sensor; and an evacuation instruction means for generating evacuation instruction information based on an analysis result of the analysis control means.

10 Claims, 19 Drawing Sheets

(56) References Cited

U.S. PATENT DOCUMENTS

| | | | |
|---|---|---|---|
| 8,786,430 B2* | 7/2014 | Kagawa | G08B 7/066 340/539.26 |
| 9,983,011 B2* | 5/2018 | Mountain | G01C 21/206 |
| 2009/0102619 A1* | 4/2009 | Blohberger | A62B 3/00 340/332 |
| 2009/0283369 A1 | 11/2009 | Flynn et al. | |
| 2010/0309004 A1* | 12/2010 | Grundler | A62B 3/00 340/588 |
| 2012/0267202 A1* | 10/2012 | Siikonen | B66B 5/021 187/384 |
| 2014/0320282 A1 | 10/2014 | Zhang | |
| 2016/0123741 A1* | 5/2016 | Mountain | G01C 21/206 701/533 |
| 2016/0180663 A1 | 6/2016 | McMahan et al. | |
| 2016/0342905 A1 | 11/2016 | Ghose et al. | |
| 2018/0315150 A1 | 11/2018 | Comello | |

FOREIGN PATENT DOCUMENTS

| | | |
|---|---|---|
| JP | 2005-316533 A | 11/2005 |
| JP | 2008-134806 A | 6/2008 |
| JP | 2011-28627 A | 2/2011 |
| WO | 2013/111409 A1 | 8/2013 |

OTHER PUBLICATIONS

International Search Report of PCT/JP2017/027795 dated Oct. 24, 2017.
Yamamoto, et al., "Emergency Escape Guiding System", Hitachi Review, Dec. 1976, vol. 58, No. 12, pp. 971-976 (6 pages total).
Takimoto, et al., "Development of Distributed Autonomous Cooperative Evacuation Guidance System", Collected Papers in Sociotechnology Research Network, Apr. 2011, vol. 8, pp. 82-90 (9 pages total).
Yamashita, et al., "Approach to Safety and Secure Evacuation with Sensor Data Mining", Journal of the Institute of Electronics, Information and Communication Engineers, 2011, vol. 94, No. 4, pp. 294-298 (5 pages total).
Matsuno, "Active Escape Guiding System", Journal of the Illuminating Engineering Institute of Japan, 2006, vol. 90, No. 4, pp. 222-225 (4 pages total).
Jin, "History of the Emergency Exit Lighting Sign", Journal of Japan Lighting Manufacturers Association, Mar. 2015, pp. 17-23 (7 pages total).
Office Action issued Oct. 31, 2019 in related U.S. Application No. 16/574,156.

* cited by examiner

EVACUATION GUIDANCE SYSTEM AND EVACUATION GUIDANCE METHOD

CROSS REFERENCE TO RELATED APPLICATIONS

This application is a National Stage of International Application No. PCT/JP2017/027795 filed Aug. 1, 2017, claiming priority based on Japanese Patent Application No. 2016-152623 filed Aug. 3, 2016, the disclosure of which is incorporated herein in its entirety by reference.

TECHNICAL FIELD

The present invention relates to an evaluation guidance system and an evaluation guidance method that guide a person existing in a facility to evacuate.

BACKGROUND ART

In a large-scale facility such as a business place, a commercial facility, and a public facility, it is required that an unspecified large number of people who are left behind in the facility are guided to evacuate to an outside of the facility safely, reliably, and rapidly at occurrence of a state of emergency such as a fire, an earthquake, and terrorism. A firefighter, a police officer, and the like have been using a method of providing an evacuation method to an evacuee by using a speaker. However, there is a limit to an instruction from a firefighter in a large-scale facility. Further, a guide like the firefighter may meet with a secondary disaster. Thus, an evacuation guidance system without depending on an instruction from a person is proposed.

NPL 1 discloses an automated evacuation guidance system. In NPL 1, an optimum evacuation route according to a place where a fire starts is set in advance, and the set evacuation route is used as a guidance route in an emergency. In the system in NPL 1, a distribution of people left behind in a facility is assumed, and a guidance route is derived by a simulation in advance. Thus, in a technique of NPL 1, evacuation guidance may not be appropriately performed when a situation that is not assumed in the simulation occurs in an emergency.

A mental state of a person in an emergency is greatly different from that in a normal condition. For example, not a few people may try to find an evacuation direction and wander without knowing which direction an emergency exit is located in, may be petrified due to a mental shock without knowing what to do, and may become stupefied and squat down. People in such a mental state are more likely to fail to escape. Thus, people in various mental states need to be appropriately guided to an outside of a facility in an emergency. In order to guide people who are left behind in a facility to an outside of the facility without missing anybody, a location in the facility and a state of each person need to be found out.

PTL 1 discloses a method of detecting, by a sensor, a situation of a disaster in a facility at occurrence of the disaster in a power plant, a factory, or the like, and safely guiding an evacuee to evacuate. In the method of PTL 1, a situation of a disaster is detected by the sensor, a disaster area and a location of a person are also determined, and an optimum route searched and determined from a list of evacuation guidance routes stored previously is notified to the evacuee. In the technique of PTL 1, a location of a person is checked with an access monitoring sensor or a surveillance camera, a person who goes in and out of a facility is monitored, and an evacuation situation is determined.

PTL 2 discloses an evacuation guidance system using a wireless sensor network. In the system of PTL 2, a wireless sensor network disposed in a distributed manner in a facility is controlled by a centralized management method, and presence or absence of a person and a degree of congestion are determined by a human detection sensor installed in each place of the facility. A human detection sensor using a pyroelectric infrared ray sensor is able to detect a subject by acquiring a temporal change in temperature. Further, a human detection sensor using an ultrasonic sensor is able to determine the presence of a subject by measuring a distance between the sensor and the subject from reciprocating time in which ultrasonic waves emitted from the sensor are reflected by the subject and return.

Further, PTL 3 and NPL 2 also disclose an evacuation guidance system by a distributed method using a wireless sensor network. In the systems of PTL 3 and NPL 2, an evacuation guidance device installed in a distributed manner in a facility operates in a coordinated fashion by wireless communication. An example of using a crowd density sensor as a means of determining movement of people in the systems of PTL 3 and NPL 2 is disclosed.

Further, NPL 3 discloses an evacuation guidance method of measuring an evacuation action by using classification of actions of people, and determining a tendency of an evacuation action. In NPL 3, when a movement destination for going to a destination or a way point is determined, an action of a person is specifically measured by a stereo camera or a laser range scanner. On the other hand, when a route or a way point to a destination is determined or a destination is determined, movement of a person is measured by a measurement system with a monocular camera or manual work.

In a case of presence of an unspecified large number of evacuees in a large-scale facility, an appropriate evacuation route may not be found because the evacuees are unfamiliar with the place or psychologically disturbed. NPL 4 and NPL 5 disclose a system for actively guiding an evacuee to an emergency exit by a flashing light and preceding sound.

CITATION LIST

Patent Literature

[PTL 1] Japanese Unexamined Patent Application Publication No. 2003-196770
[PTL 2] Japanese Unexamined Patent Application Publication No. 2005-316533
[PTL 3] Japanese Unexamined Patent Application Publication No. 2008-134806

Non Patent Literature

[NPL 1] Yuji YAMAMOTO, Kouzou AKAZAWA, Toru UNETA, and Masahiro OGURI, "Emergency Escape Guiding System", Hitachi Review, December 1976, Vol. 58, No. 12, pp. 971 to 976
[NPL 2] Koichi TAKIMOTO, Fusanori MIURA, Takahiro MATSUMOTO, Yuzuru SEKIHARA, Yoshinori KUMITA, and Shingo YAMAMOTO, "Development of Distributed Autonomous Cooperative Evacuation Guidance System", Collected Papers in Sociotechnology Research Network, April 2011, Vol. 8, pp. 82 to 90
[NPL 3] Tomohisa YAMASHITA, Shunsuke SOEDA, Masaki ONISHI, Ikushi YODA, and Itsuki NODA, "Approach to Safety and Secure Evacuation with Sensor Data Mining", Journal of the Institute of Electronics, Information and Communication Engineers, 2011, Vol. 94, No. 4, pp. 294 to 298

[NPL 4] Masaru MATSUNO, "Active Escape Guiding System", Journal of the Illuminating Engineering Institute of Japan, 2006, Vol. 90, No. 4, pp. 222 to 225

[NPL 5] Tadahisa J I N, "History of the Emergency Exit Lighting Sign", Journal of Japan Lighting Manufacturers Association, March 2015, pp. 17 to 23

SUMMARY OF INVENTION

Technical Problem

According to the techniques of PTLs 1 to 3 and NPLs 2 and 3, presence and movement of a person in a facility is able to be detected by a camera and a human detection sensor in an emergency. However, in the techniques of PTLs 1 to 3 and NPLs 2 and 3, there is a problem that, in a case of poor visibility or in a case where heat is generated at occurrence of a fire, a situation and movement of a person cannot be accurately detected, and thus a malfunction may occur.

Further, according to the techniques of NPLs 4 and 5, even an evacuee who is psychologically disturbed can be appropriately guided to an emergency exit by a flashing light and preceding sound. However, in the techniques of NPLs 4 and 5, there is a problem that certain light and sound continue to be output regardless of a behavioral state of an evacuee, and thus a more psychological burden may be placed on an evacuee who is disturbed and unable to move.

In order to solve the above-described problems, an object of the present invention is to provide an evacuation guidance system capable of detecting a behavioral state of an evacuee in a facility and providing an evacuation instruction to the evacuee according to the behavioral state.

Solution to Problem

An evacuation guidance system according to the present invention includes: a storage means; an analysis control means for acquiring pressure data generated by at least one pressure sensor installed on an evacuation route in a facility and storing the pressure data in the storage means, and also for comparing a plurality of pieces of the pressure data generated in a verification time period, analyzing a temporal change in the pressure data, and analyzing a state of a person located on the pressure sensor; and an evacuation instruction means for generating evacuation instruction information based on an analysis result of the analysis control means.

An evacuation guidance method according to the present invention includes: acquiring pressure data generated by at least one pressure sensor installed on an evacuation route in a facility, and storing the pressure data in a storage means; comparing a plurality of pieces of the pressure data generated in a verification time period, analyzing a temporal change in the pressure data, and analyzing a state of a person located on the pressure sensor; and generating evacuation instruction information based on an analysis result.

Advantageous Effects of Invention

The present invention is able to provide an evacuation guidance system capable of detecting a behavioral state of an evacuee in a facility and providing an evacuation instruction to the evacuee according to the behavioral state.

EXAMPLE EMBODIMENT

Hereinafter, example embodiments of the present invention are described by using drawings. However, limitation technically preferable to the present invention is imposed on the example embodiments described below, but the example embodiments do not limit the scope of the invention to the following description. Note that, the same place is provided with the same reference sign in all the drawings used for the description of the example embodiments below unless there is a particular reason. Further, repetitive description of the same configuration and operation may be omitted from the example embodiments below.

First Example Embodiment

Configuration

Figure 1:
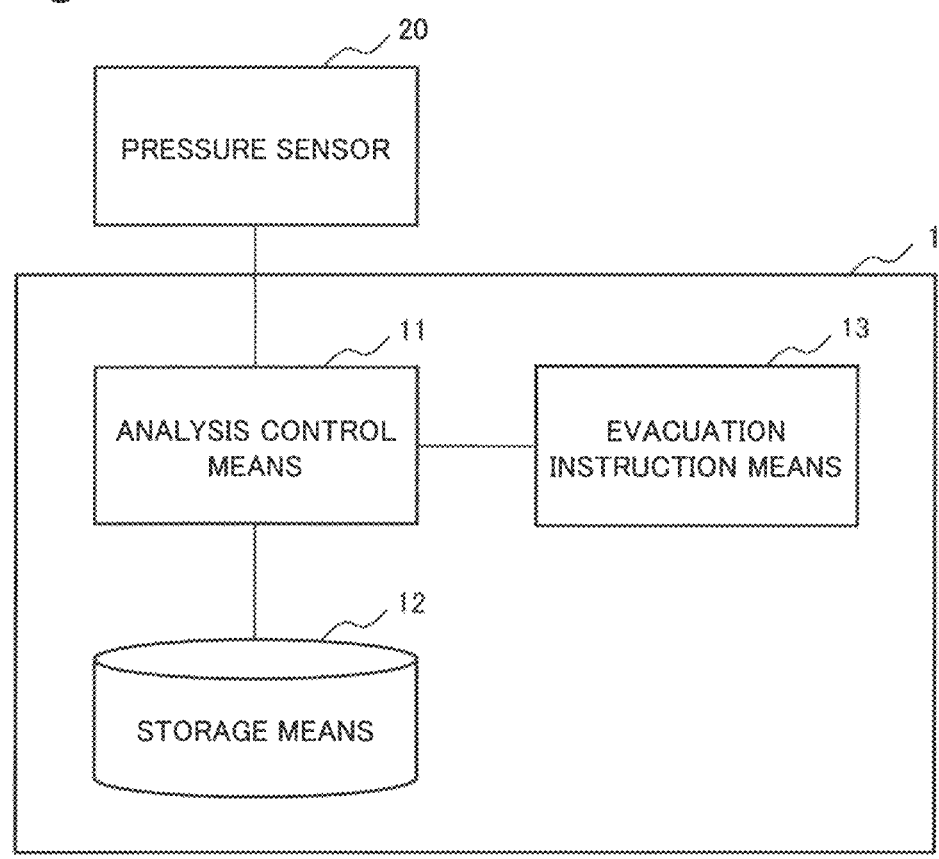
FIG. 1 is a block diagram illustrating a configuration of an evacuation guidance system according to a first example embodiment of the present invention.

First, an evacuation guidance system according to a first example embodiment of the present invention is described with reference to drawings. FIG. 1 is a block diagram illustrating a configuration of an evacuation guidance system 1 according to the present example embodiment.

The evacuation guidance system 1 includes an analysis control means 11, a storage means 12, and an evacuation instruction means 13. The evacuation guidance system 1 is connected to at least one pressure sensor 20 installed on an evacuation route in a facility. Note that, the pressure sensor 20 itself may be included in the evacuation guidance system 1.

The pressure sensor 20 is a sensor that measures pressure applied thereto. The pressure sensor 20 has a structure in which a plurality of pressure-sensitive units are arranged. Each of the pressure-sensitive units included in the pressure sensor 20 measures magnitude (pressure value) of applied pressure. The pressure sensor 20 outputs data (hereinafter pressure data) in which a pressure value measured by each of the pressure-sensitive units is associated with a time at which pressure is detected to the analysis control means 11.

Specifically, the pressure sensor 20 outputs pressure data in which a pressure value applied to each of the pressure-sensitive units is associated with positional information (address) about each of the pressure-sensitive units. Note that, a set of pressure data in which a pressure value measured by the pressure-sensitive unit to which pressure is applied is associated with an address of each of the pressure-sensitive units is also referred to as a pressure pattern. In other words, the pressure sensor 20 is formed into a sheet form including a plurality of pressure-sensitive elements arranged in a grid pattern, generates a pressure pattern in which a pressure value measured by the pressure-sensitive element to which pressure is applied is patterned, and outputs the generated pressure pattern included in pressure data. For example, the pressure pattern may be in a data format in which a region to which pressure is applied can be mapped two-dimensionally or a data format that can be expressed by a graph including a pressure value associated with an address of the pressure-sensitive unit. Note that, a data format of the pressure pattern is not limited.

Further, the pressure sensor 20 may be formed as a pressure-sensitive sheet including a plurality of pressure-sensitive elements. The pressure-sensitive sheet is a device capable of measuring applied pressure. The pressure-sensitive sheet includes a pressure-sensitive element containing a pressure-sensitive material having an electrical resistance changed according to magnitude of applied pressure. The pressure-sensitive sheet is a sensor that acquires a change in current value due to a change in electrical resistance according to magnitude of pressure applied to the pressure-sensitive material constituting the pressure-sensitive element, and measures a pressure value applied to each of the pressure-sensitive elements.

Note that, the pressure sensor 20 may be formed as a single pressure-sensitive sheet in which a plurality of pressure-sensitive elements are arranged or may be formed by arranging a plurality of pressure-sensitive sheets each including at least one pressure-sensitive element. Hereinafter, description is made, based on a configuration in which a pressure-sensitive sheet including a structure including a plurality of pressure-sensitive elements arranged in matrix is used as the pressure sensor 20. The pressure-sensitive sheet including the plurality of pressure-sensitive elements acquires a change in current value due to a change in resistance value of the pressure-sensitive material according to pressure applied to the pressure-sensitive element by an active matrix method.

A low price of a pressure-sensitive sheet having a large area is expected due to development of printing electronics. Thus, it is becoming possible to install a pressure-sensitive sheet on a surface of a floor in a facility in terms of cost. For example, a distance between pressure-sensitive elements constituting a pressure-sensitive sheet may be set to about one centimeter in order to identify presence of a person. In this case, the pressure-sensitive sheet has a ten thousand of pixels per one square meter.

The plurality of pressure-sensitive elements included in the pressure sensor 20 are disposed in a grid pattern at intervals to a degree that presence or absence of a person on the pressure sensor 20 can be determined. The pressure sensor 20 outputs pressure data for analyzing a behavioral state of a person on the sensor. The pressure sensor 20 may be configured to output a pressure pattern.

At least one pressure sensor 20 is installed on an evacuation route in a facility. Note that, a place where the pressure sensor 20 is installed can be arbitrarily set.

For example, the pressure sensor 20 is installed near an entrance of a facility. When the pressure sensor 20 is installed near an entrance, the number of people who go in and out of the facility and the number of people who have been able to evacuate to the outside of the facility in an emergency can be determined. Further, the pressure sensor 20 is installed at an arbitrary point in a facility. When the pressure sensor 20 is installed at a plurality of points, the number of people present between the points and a person who cannot move from a certain point can be detected. Further, the pressure sensor 20 may be installed in a position, such as a rest room and a locker room, in which it is difficult to install a surveillance camera in terms of privacy. While a surveillance camera cannot be usually placed in a rest room and a locker room in terms of privacy, the pressure sensor 20 can be installed in a rest room and a locker room.

The analysis control means 11 is connected to the pressure sensor 20, the storage means 12, and the evacuation instruction means 13. The analysis control means 11 starts operating in an emergency and acquires pressure data (hereinafter referred to as data to be analyzed) from the pressure sensor 20. The analysis control means 11 may be started from the outside when an emergency situation occurs or by detecting an emergency situation by the analysis control means 11 itself.

The analysis control means 11 compares a plurality of pieces of pressure data generated in a certain time period (hereinafter a verification time period), and verifies a temporal change in the pressure data. The analysis control means 11 determines presence or absence of a person on the pressure sensor 20 from the pressure data acquired in the verification time period, and analyzes a state of the person located on the pressure sensor 20 from the temporal change in the pressure data. Note that, the analysis control means 11 may start operating in a normal condition and acquire pressure data in the normal condition. For example, the analysis control means 11 compares a temporal change in pressure data with a typical pattern, and analyzes a situation of a person on the pressure sensor 20.

In other words, the analysis control means 11 determines whether a person is located on the pressure sensor 20 from a temporal change in a plurality of pieces of pressure data generated in a verification time period. Then, when the analysis control means 11 determines that a person is located on the pressure sensor 20, the analysis control means 11 analyzes a temporal change in a pressure pattern included in the pressure data, and determines a state of the person located on the pressure sensor 20. The analysis control means 11 outputs an analysis result to the evacuation instruction means 13.

For example, the analysis control means 11 analyzes a state of a person being a moving object by using a ground contact area of a subject located on the pressure sensor 20 and a temporal change in pressure data. For example, the analysis control means 11 refers to typical pattern data about states where a person on the pressure sensor 20 is standing, sitting, lying, and the like, and analyzes a state of the person on the pressure sensor 20. Further, the analysis control means 11 analyzes a psychological state such as a state where the person on the pressure sensor 20 is taking a calm evacuation action, taking an action in panic and moving in confusion, or the like from a temporal change in pressure data.

Herein, an example in which the analysis control means 11 estimates a psychological state of a person on the pressure sensor 20 is described.

First, the analysis control means 11 extracts a plurality of pieces of pressure data acquired in a verification time period. The analysis control means 11 detects presence or absence of a moving object on the pressure sensor 20 by using the extracted pressure data. In the present example embodiment, the analysis control means 11 identifies, as a person, an object (moving object) determined to be in motion from a temporal change in pressure data. In other words, even when it is difficult to determine whether a moving object detected from a temporal change in pressure data detected by the pressure sensor 20 is a person, the moving object is determined to be a person in consideration of safety in the present example embodiment. However, the present example embodiment may be configured to determine that a moving object that is too light or too heavy and thus determined to be clearly different from a person is not a person.

The analysis control means 11 identifies a situation of a person located on the pressure sensor 20 by analyzing a ground contact area between a moving object determined as the person and the pressure sensor 20, pressure data acquired from the pressure sensor 20, and a temporal change in the pressure data in a verification time period. At this time, the analysis control means 11 extracts a movement pattern of the person on the pressure sensor 20 from the temporal change in the pressure data (pressure pattern) in the verification time period, and estimates a psychological situation of the person. Note that, a typical pattern of the movement pattern of the person located on the pressure sensor 20 is associated with a psychological situation and stored in the storage means 12 in advance.

For example, pattern data in which a temporal change in a pressure pattern is associated with a psychological state of a person are stored in the storage means 12 in advance. The analysis control means 11 specifies pattern data corresponding to a temporal change in a plurality of pieces of pressure data generated in a verification time period, and determines a psychological state of a person located on the pressure sensor 20.

When a moving object determined as a person moves as instructed by the evacuation instruction means 13, the analysis control means 11 determines that the person is in a normal psychological state. On the other hand, when a moving object determined as a person does not move as instructed by the evacuation instruction means 13, the analysis control means 11 determines that the person is not in a normal psychological state.

For example, when a person moving on the pressure sensor 20 is moving in a direction instructed by the evacuation instruction means 13, the analysis control means 11 determines that the person is in a normal psychological state.

Further, the analysis control means 11 identifies, based on a contact area and a contact pattern between an object identified as a person on the pressure sensor 20 and the pressure sensor 20, a state where the person is standing, sitting, lying, or the like. For example, the analysis control means 11 determines whether a contact area between the pressure sensor 20 and an object corresponds to a ground contact area of a sole, an area of the whole body, an area of buttocks, or an area of a side of a body.

The storage means 12 is connected to the analysis control means 11. The storage means 12 stores pressure data acquired by the pressure sensor 20, an evacuation situation of an evacuee, an analysis result by the analysis control means 11, and the like. Further, the storage means 12 stores typical pressure data (pressure pattern). Furthermore, the storage means 12 stores a temporal change in a pressure pattern.

The evacuation instruction means 13 is connected to the analysis control means 11. Further, the evacuation instruction means 13 is connected to an output device (not illustrated) such as a display and a speaker installed near the pressure sensor 20. The evacuation instruction means 13 outputs evacuation instruction information according to a state of an evacuee to the output device.

The evacuation instruction means 13 outputs evacuation instruction information according to situations of people present in a facility to output devices installed near the pressure sensors 20 that detect the respective people. In other words, the evacuation instruction means 13 outputs evacuation instruction information according to a state of an evacuee in a concentrated, individual, and automatic manner. The evacuation instruction means 13 outputs evacuation instruction information for generating visual or auditory information for an evacuee.

For example, the evacuation instruction means 13 outputs evacuation instruction information about an optimum evacuation route from a point at which an evacuation instruction is provided. For example, when an identified person is in a panic state, the evacuation instruction means 13 outputs, as evacuation instruction information, voice such as "please calm down" to calm the person down mentally. At this time, the evacuation instruction means 13 uses data about a psychological state of the person detected by the analysis control means 11.

When the evacuation instruction means 13 determines that the detected person is not in a normal psychological state, based on an analysis result of the analysis control means 11, the evacuation instruction means 13 outputs evacuation instruction information according to the psychological state of the person.

The configuration of the evacuation guidance system 1 according to the present example embodiment is described above. In the evacuation guidance system 1 in the present example embodiment, the entire function of the system preferably operates in an emergency for the purpose of saving power and avoiding acquisition of unnecessary personal information. Note that, any function may also operate in a normal condition for checking the system and collecting data.

Operation

Figure 2:
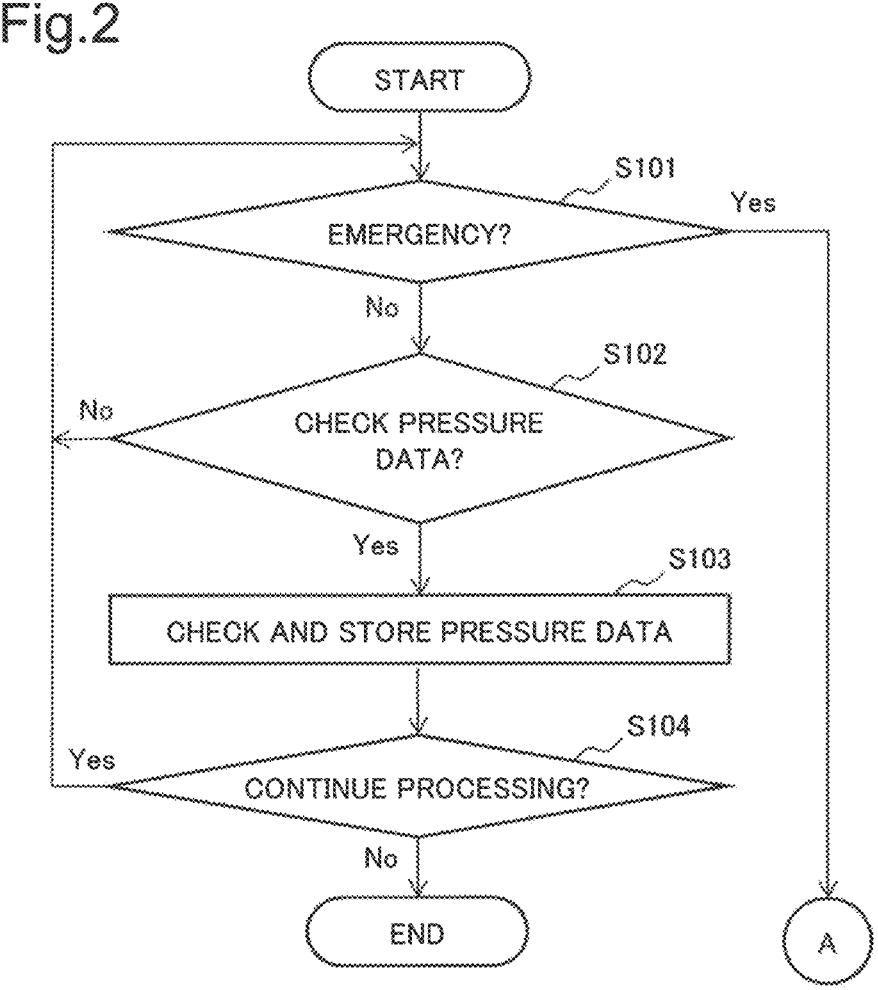
FIG. 2 is a flowchart for describing an operation of the evacuation guidance system according to the first example embodiment of the present invention.
Figure 3:
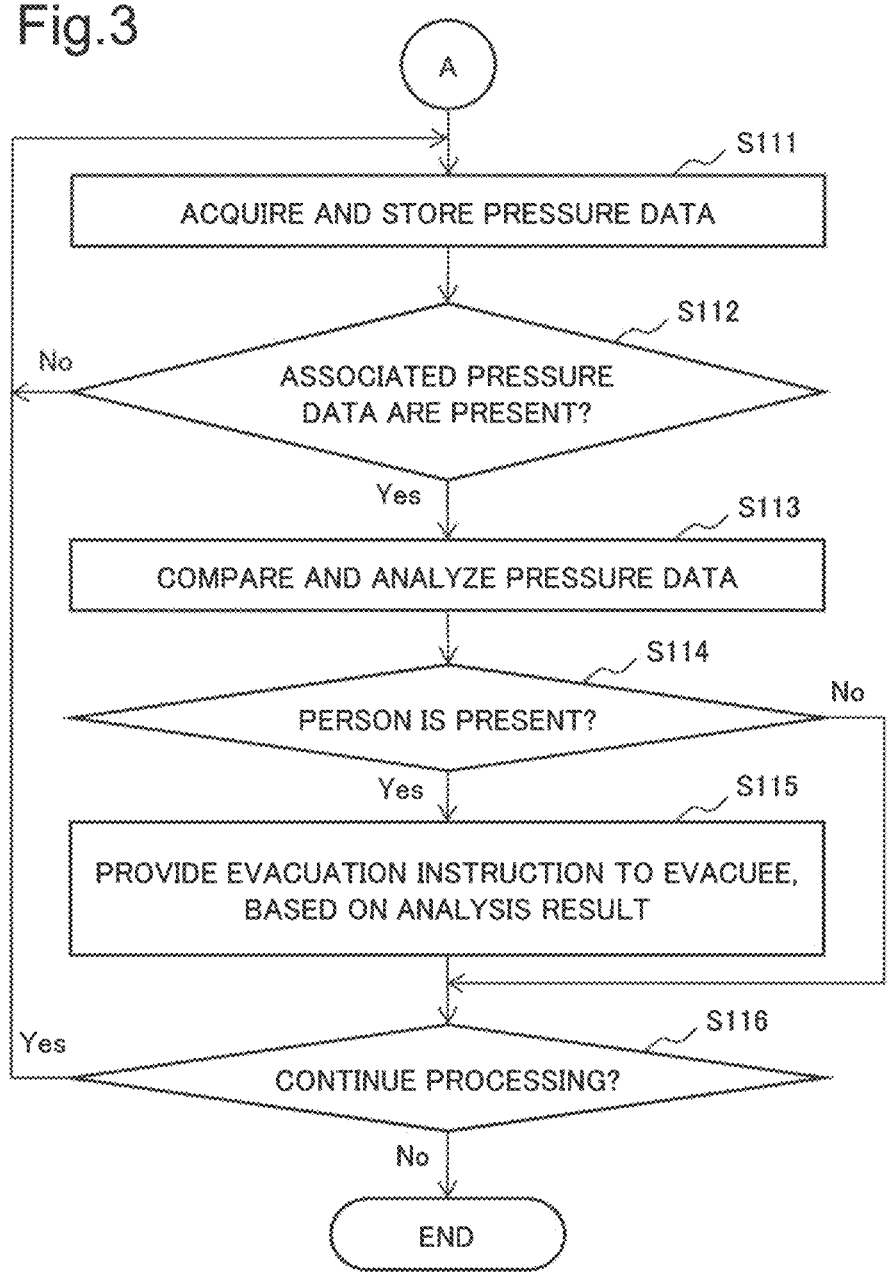
FIG. 3 is a flowchart for describing an operation of the evacuation guidance system according to the first example embodiment of the present invention.

Next, an operation of the evacuation guidance system 1 according to the present example embodiment is described by using flowcharts in FIGS. 2 and 3. FIG. 2 is a flowchart concerned with an operation in a normal condition. FIG. 3 is a flowchart concerned with an operation in an emergency.

In FIG. 2, the evacuation guidance system 1 first determines whether or not the present time is in an emergency (Step S101). The evacuation guidance system 1 determines whether the present point in time is in an emergency or a normal condition by using information from an emergency informing apparatus, a smoke detecting device, a seismometer, a security system, and the like installed in a facility. For example, the analysis control means 11 may be configured to be connected to external apparatus, device, and system and start operating in an emergency.

In a case of a normal condition (No in Step S101), when the evacuation guidance system 1 checks pressure data (Yes in Step S102), the evacuation guidance system 1 checks pressure data output from the pressure sensor 20 and stores the checked data (Step S103). When the processing continues (Yes in Step S104), the processing returns to Step S101. When the processing does not continue (No in Step S104), the processing along the flowchart in FIG. 2 is terminated.

On the other hand, when the evacuation guidance system 1 does not check pressure data (No in Step S102), the processing returns to Step S101.

The evacuation guidance system 1 mainly acquires pressure data when a person is not located on the pressure sensor 20 in the routine from Step S101 to Step S103. Note that, the evacuation guidance system 1 may be configured to acquire pressure data when a person is located on the pressure sensor 20 in a normal condition in the routine from Step S101 to Step S103.

Then, in a case of an emergency (Yes in Step S101), the processing proceeds to the flowchart in FIG. 3.

In FIG. 3, the evacuation guidance system 1 first acquires pressure data output from the pressure sensor 20, and stores the acquired pressure data in the storage means 12 (Step S111).

Herein, the evacuation guidance system 1 determines presence or absence of pressure data associated with the stored pressure data (Step S112).

When the associated pressure data are present (Yes in Step S112), the evacuation guidance system 1 compares and analyzes the pieces of pressure data associated with each other. The pieces of pressure data associated with each other are pieces of pressure data acquired by the same pressure sensor 20 about pressure applied by the same subject in a verification time period. The evacuation guidance system 1 regards, as pieces of pressure data associated with each other, pieces of pressure data, based on pressure applied by a subject considered to have weight identical to weight calculated from a pressure value acquired by the pressure sensor 20 in a verification time period. On the other hand, when the associated pressure data are not present (No in Step S112), the processing returns to Step S111.

Herein, the evacuation guidance system 1 determines presence or absence of a person on the pressure sensor 20 (Step S114).

When the evacuation guidance system 1 determines that a person is present on the pressure sensor 20 (Yes in Step S114), the evacuation guidance system 1 causes the evacuation instruction means 13 to output evacuation instruction information for the person, based on an analysis result (Step S115). On the other hand, when the evacuation guidance system 1 determines that a person is not present on the pressure sensor 20 (No in Step S114), the processing proceeds to Step S116.

When the processing continues (Yes in Step S116), the processing returns to Step S111. When the processing is terminated (No in Step S116), the processing along the flowchart in FIG. 3 is terminated.

The operation of the evacuation guidance system 1 according to the present example embodiment is described above. Note that, the operation based on the flowcharts in FIGS. 2 and 3 is one example, and does not limit the scope of the present invention.

Pressure-Sensitive Sheet

Herein, one example of the pressure sensor 20 that generates pressure data analyzed by the evacuation guidance system 1 in the present example embodiment is described.

Figure 4:
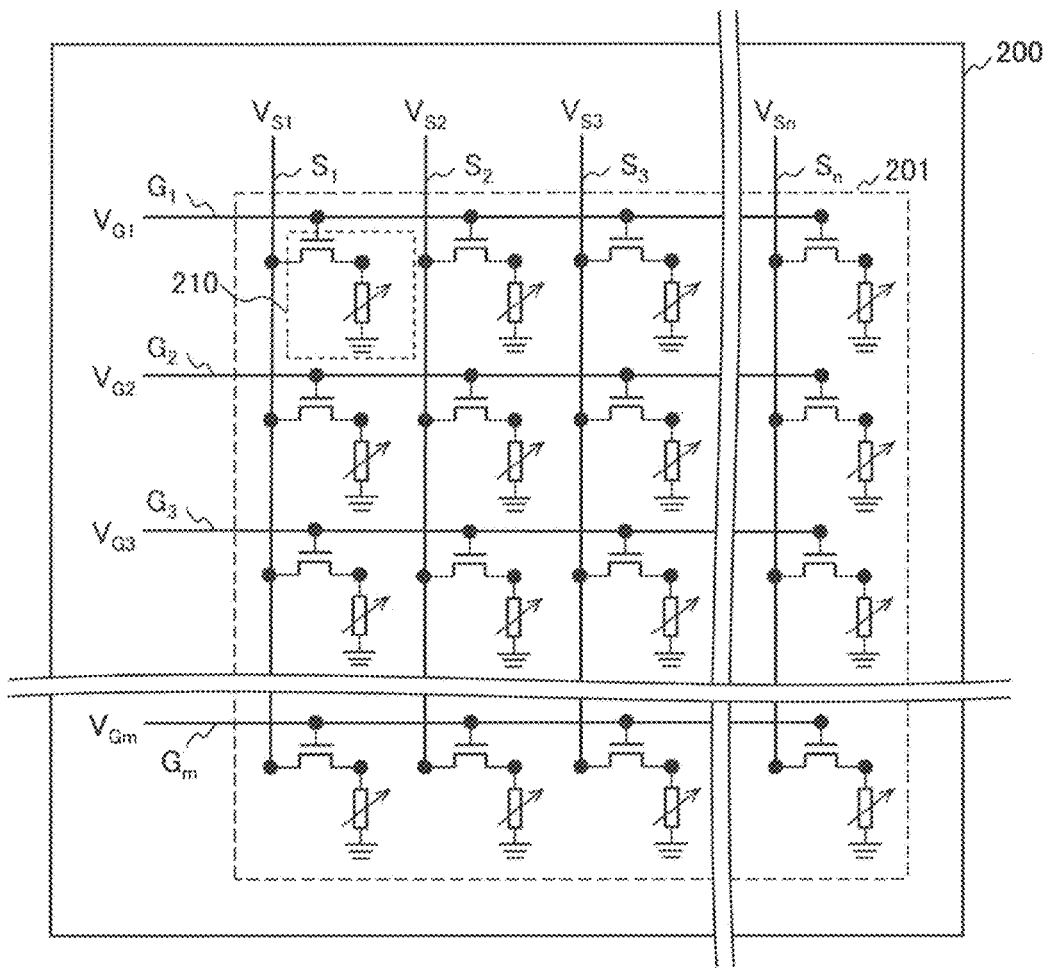
FIG. 4 is a schematic diagram illustrating a configuration example of a pressure-sensitive sheet used in the evacuation guidance system according to the first example embodiment of the present invention.

FIG. 4 is a schematic diagram illustrating a configuration of a pressure-sensitive sheet 200 as one example of the pressure sensor 20. It is assumed in the present example embodiment that the pressure-sensitive sheet 200 including pressure-sensitive elements 210 arranged in matrix is used as the pressure sensor 20. The pressure-sensitive element 210 constituting the pressure-sensitive sheet 200 includes a pressure-sensitive layer having an electrical resistance changed by application of pressure.

As in FIG. 4, the pressure-sensitive sheet 200 includes a matrix circuit 201 in which the plurality of pressure-sensitive elements 210 are two-dimensionally arranged in m rows and n columns (m and n are natural numbers). In the example of FIG. 4, the pressure-sensitive element 210 constituting the matrix circuit 201 includes at least one thin-film transistor and one resistor (pressure-sensitive layer).

With regard to the thin-film transistors included in the pressure-sensitive elements 210, gate electrodes are connected to gate lines G1 to Gm, source electrodes are connected to source lines S1 to Sn, and drain electrodes are connected to one end of the resistors. With regard to each of the resistors, one end is connected to the drain electrode of the transistor, and the other end is grounded. The respective source lines S1 to Sn and the respective gate lines G1 to Gm are orthogonal to each other. Note that, configurations of a scanning circuit, a read circuit, and the like that apply voltage to a source line and a gate line are omitted from FIG. 4. Further, although it is not illustrated in FIG. 4, the pressure-sensitive sheet 200 includes a transmission function of transmitting generated data to the evacuation guidance system 1. The pressure-sensitive sheet 200 may be connected to the evacuation guidance system 1 in a wired or wireless manner.

A two-dimensional distribution of pressure applied to the pressure-sensitive sheet 200 is acquired by two-dimensionally displaying a pressure value corresponding to a current value output from each of the pressure-sensitive elements 210 in gray scales. For example, a pressure distribution that is easy to grasp intuitively is acquired from gray-scale display in which color and gradation vary according to magnitude of pressure applied to the pressure-sensitive element 210.

Figure 5:
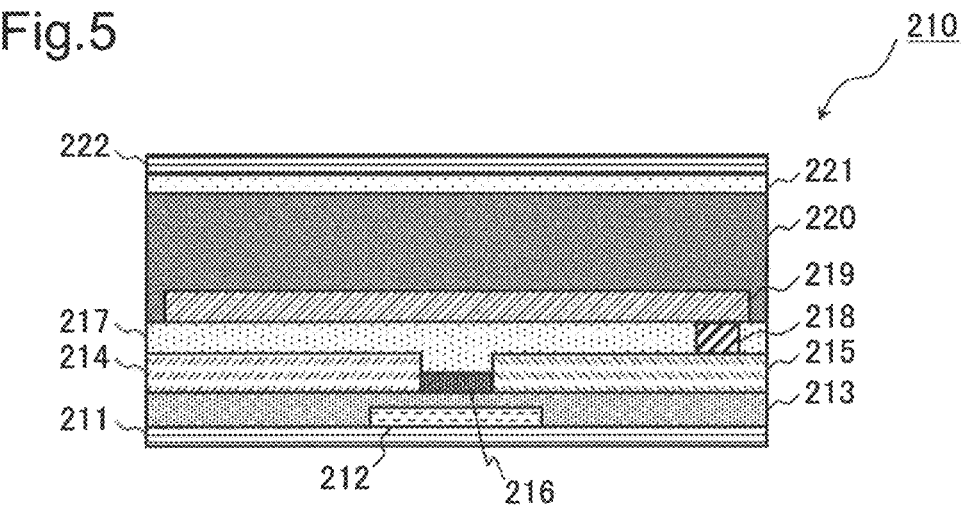
FIG. 5 is a schematic diagram illustrating a configuration example of a pressure-sensitive element included in the pressure-sensitive sheet used in the evacuation guidance system according to the first example embodiment of the present invention.

FIG. 5 is one example in which the pressure-sensitive element 210 is formed of a semiconductor element. The pressure-sensitive element 210 includes a first substrate 211, a gate electrode 212, a gate oxide film 213, a source electrode 214, a drain electrode 215, a channel layer 216, an intermediate layer 217, a via 218, a first electrode 219, a pressure-sensitive layer 220, a second electrode 221, and a second substrate 222. Note that, FIG. 5 is one example of the pressure-sensitive element 210, and does not limit the scope of the present invention. Further, when sensitivity required for the pressure-sensitive sheet 200 may be low, the pressure-sensitive element 210 may be formed of an electric circuit having a macroscopic size instead of being formed as a semiconductor element. In this case, a wire may be disposed in such a way as to be able to measure an electrical resistance for each pressure-sensitive layer 220 of each of the pressure-sensitive elements 210.

The gate electrode 212 is formed on the first substrate 211. The gate electrode 212 is covered by the gate oxide film 213. The source electrode 214 and the drain electrode 215 are formed on the gate oxide film 213 with space between the source electrode 214 and the drain electrode 215 in such a way as to form a gap on the gate electrode 212. The channel layer 216 is formed between the source electrode 214 and the drain electrode 215. The channel layer 216 is formed in a position opposite from the gate electrode 212 with respect to the gate oxide film 213. The gate electrode 212, the gate oxide film 213, the source electrode 214, the drain electrode 215, and the channel layer 216 constitute a thin-film transistor.

The source electrode 214, the drain electrode 215, and the channel layer 216 are covered by the intermediate layer 217. Note that, the channel layer 216 may be covered by a protective layer. The via 218 penetrating from the front to the back of the intermediate layer 217 is provided in a part of the intermediate layer 217. The first electrode 219 is formed on the intermediate layer 217. The via 218 allows the drain electrode 215 and the first electrode 219 to be electrically connected to each other. A configuration of a combination of the thin-film transistor, the intermediate layer 217, the via 218, and the first electrode 219 is also referred to as a pressure-sensitive cell.

The pressure-sensitive layer 220 is disposed on the intermediate layer 217 and the first electrode 219. The second electrode 221 is formed on the pressure-sensitive layer 220. The second substrate 222 is formed on the second electrode 221.

As in FIG. 5, each of the pressure-sensitive elements 210 includes the pressure-sensitive layer 220 that becomes deformed by application of pressure. An electrical resistance changes according to an amount of deformation in a deformed place of the pressure-sensitive layer 220. The pressure-sensitive layer 220 has a structure in which a thin-film transistor element and the pressure-sensitive layer 220 are connected in series. A current according to an amount of deformation of the pressure-sensitive layer 220 flows through the thin-film transistor element in an ON state.

When an object is placed on the pressure-sensitive sheet 200, a pressure value is detected by the pressure-sensitive element 210 to which the object applies pressure. The pressure-sensitive sheet 200 outputs pressure data in which the pressure value detected by each of the pressure-sensitive elements 210 is associated with an address (positional information) of the pressure-sensitive element 210. At this time, the pressure-sensitive sheet 200 may output pressure data about all the pressure-sensitive elements 210 or may output only pressure data about the pressure-sensitive element 210 to which pressure is applied. Further, the pressure-sensitive sheet 200 may be configured to output a current value detected in each of the pressure-sensitive elements 210 to the evacuation guidance system 1. In other words, the pressure-sensitive sheet 200 associates an address of each of the pressure-sensitive elements 210 with at least any of a pressure value and a current value and outputs the address.

Next, a method of detecting pressure by using the pressure-sensitive element 210 is described.

First, in order to detect pressure, a voltage is applied between the source electrode 214 and the second electrode 221, a voltage is also applied to the gate electrode 212, and thus the thin-film transistor is brought into the ON state.

A current does not flow between the source electrode 214 and the second electrode 221 because the pressure-sensitive layer 220 exhibits an insulation property while pressure is not applied to the pressure-sensitive element 210. On the other hand, a current flows between the source electrode 214 and the second electrode 221 since the pressure-sensitive layer 220 exhibits conductivity while pressure is applied to the pressure-sensitive element 210. In other words, when a correspondence between a pressure value applied to the pressure-sensitive layer 220 and a current value flowing between the source electrode 214 and the second electrode 221 is obtained in advance, the pressure value applied to the pressure-sensitive element 210 can be measured by measuring the current value.

Next, a method of detecting a distribution of pressure applied to the pressure-sensitive sheet 200 is described.

First, a voltage is applied to the plurality of gate lines G1 to Gm in order while a voltage is applied to the second electrode 221.

Next, a current flowing through the source electrode 214 of the thin-film transistor connected to each of the gate lines G1 to Gm is measured, and which pressure-sensitive element 210 is pressurized is detected. A shape of an object on the pressure-sensitive sheet 200 can be two-dimensionally grasped by detecting presence or absence of pressure applied to all of the pressure-sensitive elements 210.

Further, in addition to presence or absence of pressure applied to each of the pressure-sensitive elements 210, a pressure value applied to each of the pressure-sensitive elements 210 can be measured by using the pressure-sensitive sheet 200. Thus, in addition to a shape of an object on the pressure-sensitive sheet 200, a pressure distribution can be three-dimensionally expressed by using the pressure-sensitive sheet 200.

Next, a specific example of a structural element constituting the pressure-sensitive element 210 is described in detail.

A material for the first substrate 211 and the second substrate 222 is not particularly limited as long as the material can hold an internal structural element, such as an inorganic material including glass and silicon and a high molecular material including acrylic-based resin, polyester-based resin, and polycarbonate-based resin. However, the first substrate 211 and the second substrate 222 preferably have flexibility to a deformable degree by applied pressure and rigidity to an unbreakable degree even by being repeatedly stepped thereon. It is particularly desirable that the second substrate 222 formed on an outermost surface of the pressure-sensitive element 210 is formed of a high molecular material that easily transmits pressure to the pressure-sensitive layer 220 and has flexibility in consideration of application of repetitive pressure. Further, a fiber body such as a cloth may be used as the second substrate 222.

Conventional metal can be used as an electrode material for the gate electrode 212, the source electrode 214, the drain electrode 215, the via 218, the first electrode 219, the second electrode 221, and the like. For example, metal such as gold, silver, platinum, copper, indium, aluminum, and magnesium can be used as an electrode material. Further, an alloy such as an indium tin oxide alloy, a magnesium-indium alloy, a magnesium-aluminum alloy, an aluminum-lithium alloy, an aluminum-scandium-lithium alloy, and a magnesium-silver alloy can be used as an electrode material. Further, a conductive oxide such as tin oxide and an organic material such as a conductive polymer can be used as an electrode material. An electrode material constituting the pressure-sensitive element 210 preferably has resistance to deformation under pressure applied to the pressure-sensitive sheet 200.

An electrode constituting the pressure-sensitive element 210 can be formed by conventional electrode formation processing such as a vacuum deposition method, a sputtering method, an etching method, and a lift-off method. Further, when an electrode is formed of an organic material, silver paste, a dispersion including metallic particles, or a metallic organic compound as a raw material, solution processing such as a spin coat method, a dip method, a dispenser method, and an ink-jet method can also be used. Further, an electrode may be processed by using a conventional photolithographic etching method, a patterning method using a shadow mask, and the like. When an electrode is formed by using solution processing, the electrode may be directly printed by a dispenser method or an ink-jet method.

The gate electrode 212, the source electrode 214, and the drain electrode 215 that are too thin cause a decrease in electrical conduction and that are too thick cause a decrease in insulation property of the gate oxide film 213 from a height of irregularities. Thus, the gate electrode 212, the source electrode 214, and the drain electrode 215 preferably have a film thickness of greater than or equal to 50 nanometers and less than or equal to 200 nanometers. The via 218 may have a thickness substantially identical to a film thickness of the intermediate layer 217. The first electrode 219 preferably has a film thickness of greater than or equal to 1 micrometer in order to acquire electrical connection with the pressure-sensitive layer 220.

A material that has an electrical insulation property and does not affect an electrical characteristic of the channel layer 216 is applicable to the gate oxide film 213 and the intermediate layer 217. For example, an inorganic compound, such as a silicon dioxide film and a silicon nitride film, and an organic insulating material, such as acrylic resin and polyimide, can be used as a material for the gate oxide film 213 and the intermediate layer 217. Further, when a decrease in characteristic of the channel layer 216 may be caused during formation of the intermediate layer 217, a protective layer for protecting the channel layer 216 may be formed.

The gate oxide film 213 and the intermediate layer 217 can be formed by dry processing, such as a vacuum deposition method and a sputtering method, and solution processing, such as a spin coat method, a dip method, a dispenser method, and an ink-jet method.

The gate oxide film 213 that is too thick makes it difficult to maintain film formation and a characteristic of an electrode to be formed later, and also increases an applied voltage during operation of the thin-film transistor. On the other hand, the gate oxide film 213 that is too thin may cause a short circuit between the source electrode or the drain electrode and the gate electrode. Thus, it is desirable that the gate oxide film 213 has a film thickness within a range of several tens of nanometers to several hundreds of nanometers.

The intermediate layer 217 preferably has a film thickness within a range of one micrometer to ten micrometers in order to prevent an electrical short circuit between the source electrode 214 or the drain electrode 215 and the first electrode 219.

The channel layer 216 can be formed of a material having a semiconductor characteristic, such as a condensation polycyclic aromatic compound, a phthalocyanine-based compound, an amine-based compound, a phthalocyanine-based compound, and an organic compound having a polymer-based semiconductor characteristic. Examples of the condensation polycyclic aromatic compound include tetracene and pentacene. Examples of the phthalocyanine-based compound include copper phthalocyanine and zinc phthalocyanine. Examples of the organic compound having a polymer-based semiconductor characteristic include polythiophene and polyvinyl carbazole. Further, a carbon nanotube and a mixture containing a carbon nanotube may be used for the channel layer 216.

The channel layer 216 can use dry processing, such as a vacuum deposition method, and solution processing, such as a spin coat method, a dip method, a dispenser method, and an ink-jet method. The channel layer 216 that is too thin causes a decrease in current flowing through the channel and that is too thick causes an increase in resistance component in the channel, and thus the channel layer 216 preferably has a film thickness within a range of several nanometers to several hundreds of nanometers.

A material for the pressure-sensitive layer 220 is not particularly limited as long as the material has an electrical resistance changed by application of pressure. Since the pressure-sensitive layer 220 needs to stably reconstruct an insulation property and conductivity even after repetitive application of pressure, rubber in which conductive minute particles are mixed is suitable. The pressure-sensitive layer 220 preferably has a film thickness within a range of several micrometers to several hundreds of micrometers in order to change an electrical resistance according to magnitude of applied pressure.

The size of the pressure-sensitive element 210 is not particularly limited as long as a person on the pressure sensor 20 can be detected. For example, when a high resolution is not required, the size of the pressure-sensitive element 210 may be greater than or equal to 1 centimeter. Further, when a high resolution is required, the size of the pressure-sensitive element 210 may be less than or equal to 1 centimeter. When a higher resolution is required, the size of the pressure-sensitive element 210 may have the size of about 1 micrometer to 1 millimeter.

The specific example of achieving the pressure-sensitive sheet 200 is provided above, but the scope of the present invention is not limited to the above-described specific example.

Figure 6:
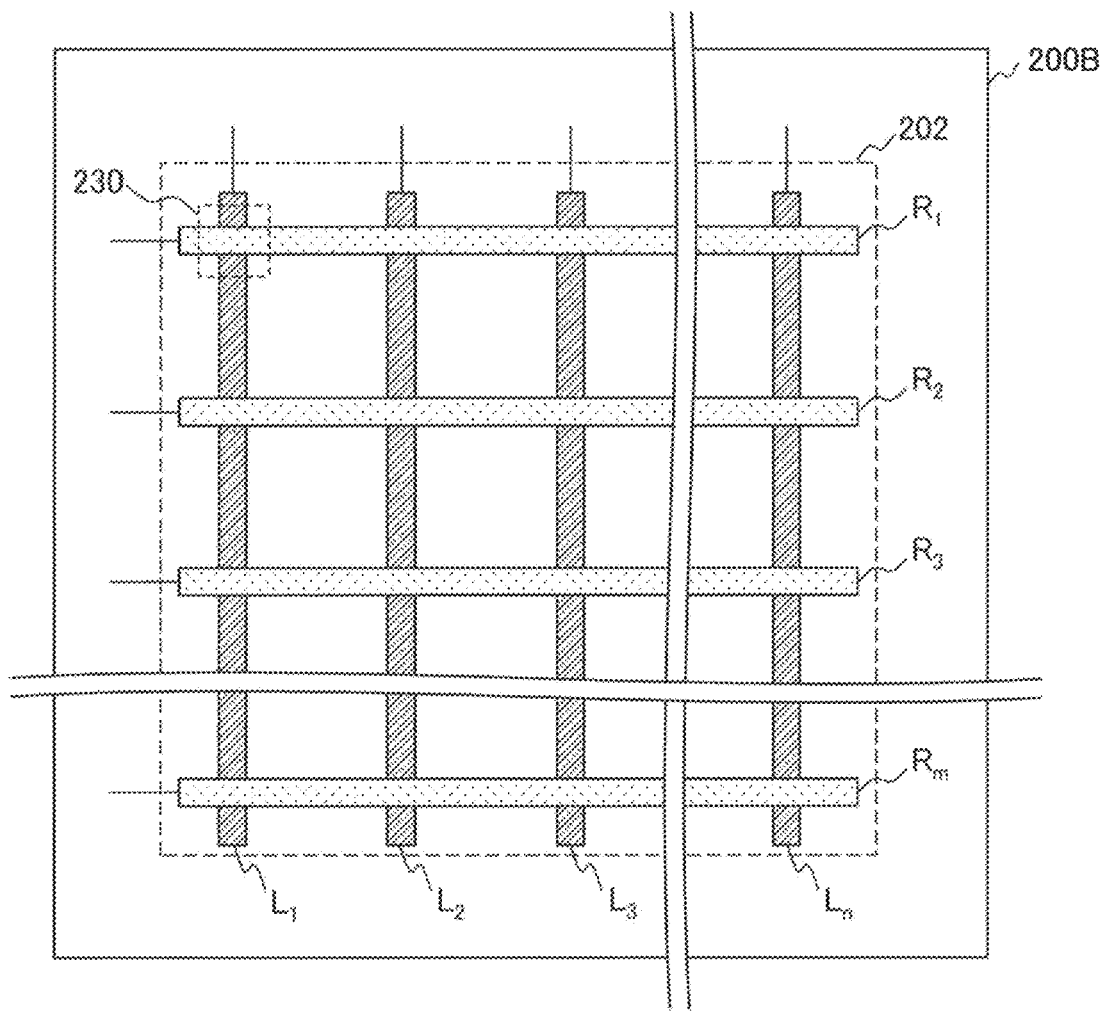
FIG. 6 is a schematic diagram illustrating a configuration example of the pressure-sensitive sheet used in the evacuation guidance system according to the first example embodiment of the present invention.
Figure 7:
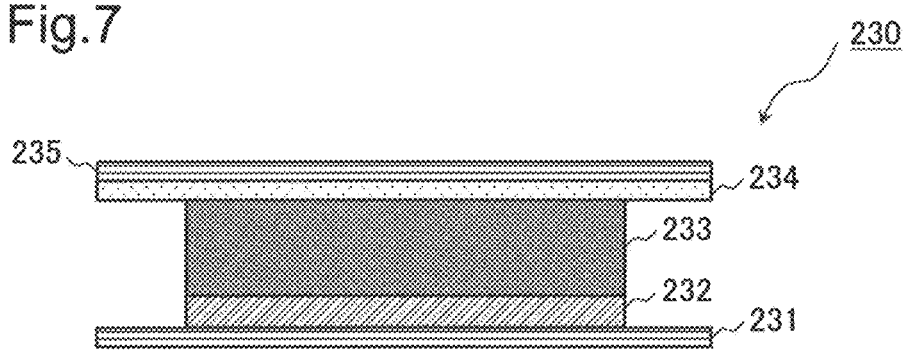
FIG. 7 is a schematic diagram illustrating a configuration example of the pressure-sensitive element included in the pressure-sensitive sheet used in the evacuation guidance system according to the first example embodiment of the present invention.

A pressure-sensitive sheet 290 in FIGS. 6 and 7 is a modification example of the pressure-sensitive sheet 200 illustrated in FIGS. 4 and 5.

A pressure-sensitive sheet 200B in FIG. 6 includes a configuration in which a plurality of wires R1 to Rm and a plurality of wires L1 to Ln are disposed to intersect each other. A pressure-sensitive element 230 is formed in a place where the plurality of respective wires R1 to Rm and the plurality of respective wires L1 to Ln intersect each other. A pressure-sensitive layer is disposed between the plurality of wires R1 to Rm and the plurality of wires L1 to Ln in the place where the pressure-sensitive element 230 is formed. Note that, configurations of a scanning circuit, a read circuit, and the like connected to the wires R1 to Rm and the plurality of wires L1 to Ln are omitted from FIG. 6. Further, although it is not illustrated in FIG. 6, the pressure-sensitive sheet 200B includes a function of transmitting generated pressure data to the evacuation guidance system 1. The pressure-sensitive sheet 200B may be connected to the evacuation guidance system 1 in a wired or wireless manner.

FIG. 7 is a schematic diagram illustrating a cross-sectional structure of the pressure-sensitive element 230. The pressure-sensitive element 230 includes a first substrate 231, a first electrode 232, a pressure-sensitive layer 233, a second electrode 234, and a second substrate 235. The first substrate 231, the first electrode 232, the pressure-sensitive layer 233, the second electrode 234, and the second substrate 235 included in the pressure-sensitive element 230 in FIG. 7 respectively correspond to the first substrate 211, the first electrode 219, the pressure-sensitive layer 220, the second electrode 221, and the second substrate 222 in the pressure-sensitive element 210 in FIG. 5.

A person on the pressure-sensitive sheet 200B can also be detected by using the pressure-sensitive sheet 200B in FIGS. 6 and 7, similarly to the pressure-sensitive sheet 200 in FIGS. 4 and 5.

Figure 8:
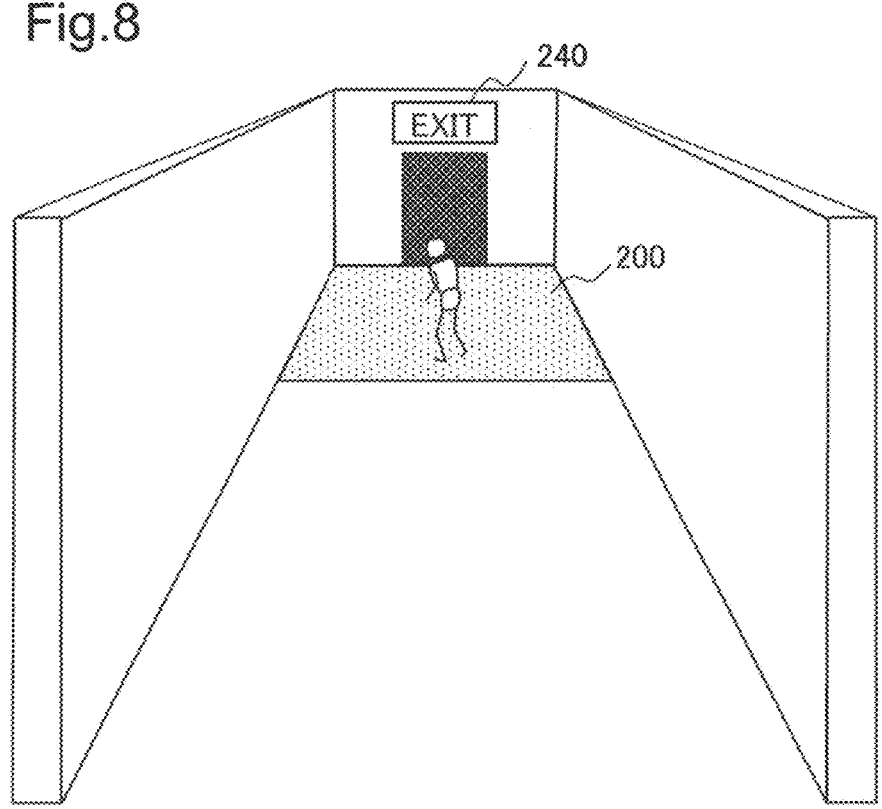
FIG. 8 is a schematic diagram illustrating an arrangement example of the pressure-sensitive sheet used in the evacuation guidance system according to the first example embodiment of the present invention.

Herein, an arrangement example of the pressure-sensitive sheet 200 is described with reference to drawings. FIG. 8 is a schematic diagram illustrating one example of disposing the pressure-sensitive sheet 200 on an evacuation route. In the example of FIG. 8, the pressure-sensitive sheet 200 is disposed before an exit in a facility. Further, an output device 240 that outputs evacuation instruction information output from the evacuation instruction means 13 is installed near the pressure-sensitive sheet 200.

The evacuation guidance system 1 in the present example embodiment acquires a psychological state of a person on the pressure-sensitive sheet 200 by using pressure data generated by the pressure-sensitive sheet 200 disposed on the evacuation route as in FIG. 8. A person who tries to evacuate from the facility to the outside can evacuate to the outside of the facility by responding to evacuation instruction information output to the output device 240.

Figure 9:
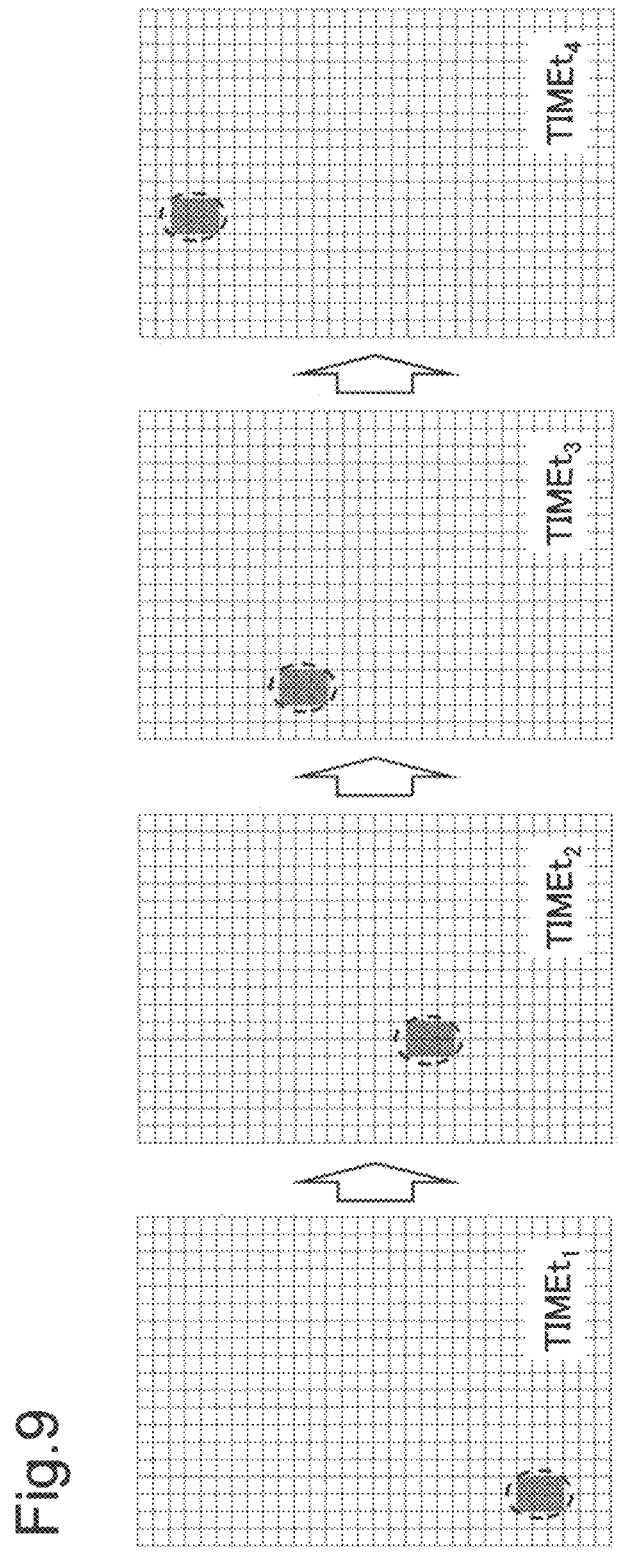
FIG. 9 is a schematic diagram illustrating one example of a temporal change in a distribution of pressure applied to the pressure-sensitive sheet from which pressure data are acquired by the evacuation guidance system according to the first example embodiment of the present invention.
Figure 10:
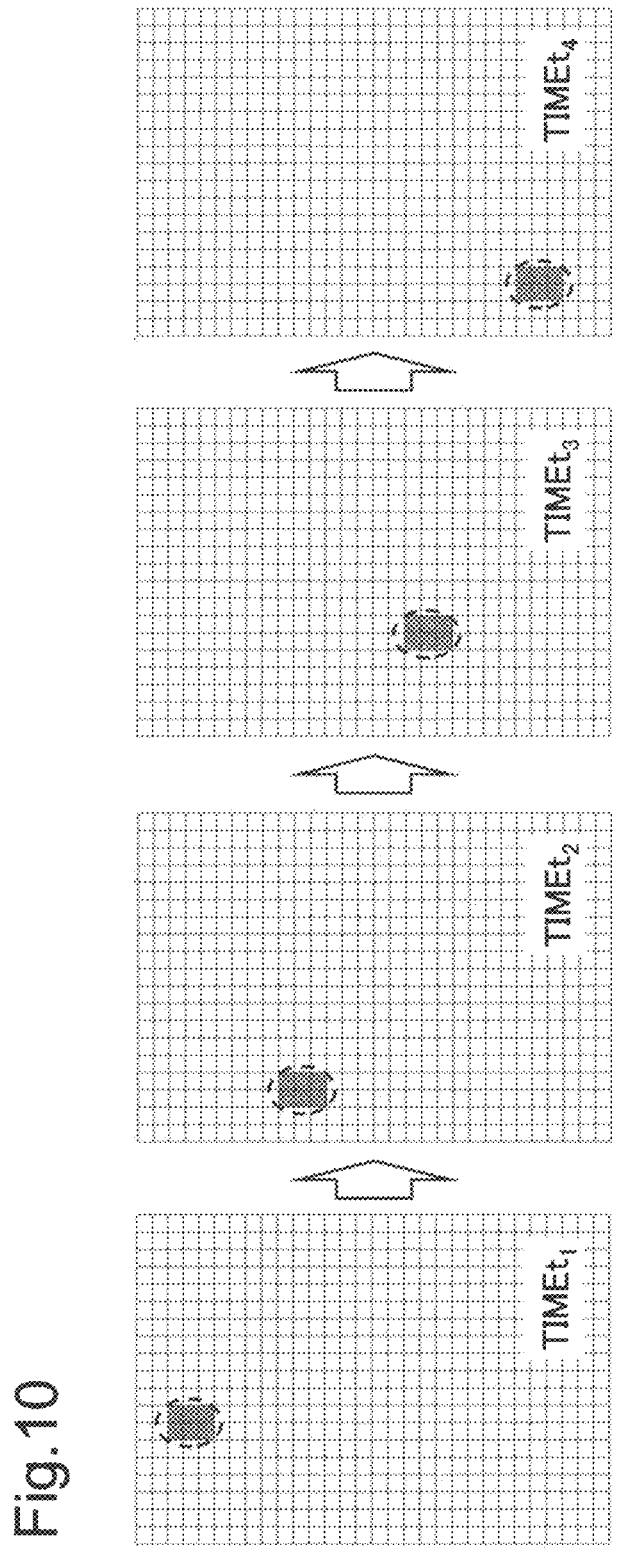
FIG. 10 is a schematic diagram illustrating another example of a temporal change in the distribution of pressure applied to the pressure-sensitive sheet from which pressure data are acquired by the evacuation guidance system according to the first example embodiment of the present invention.
Figure 11:
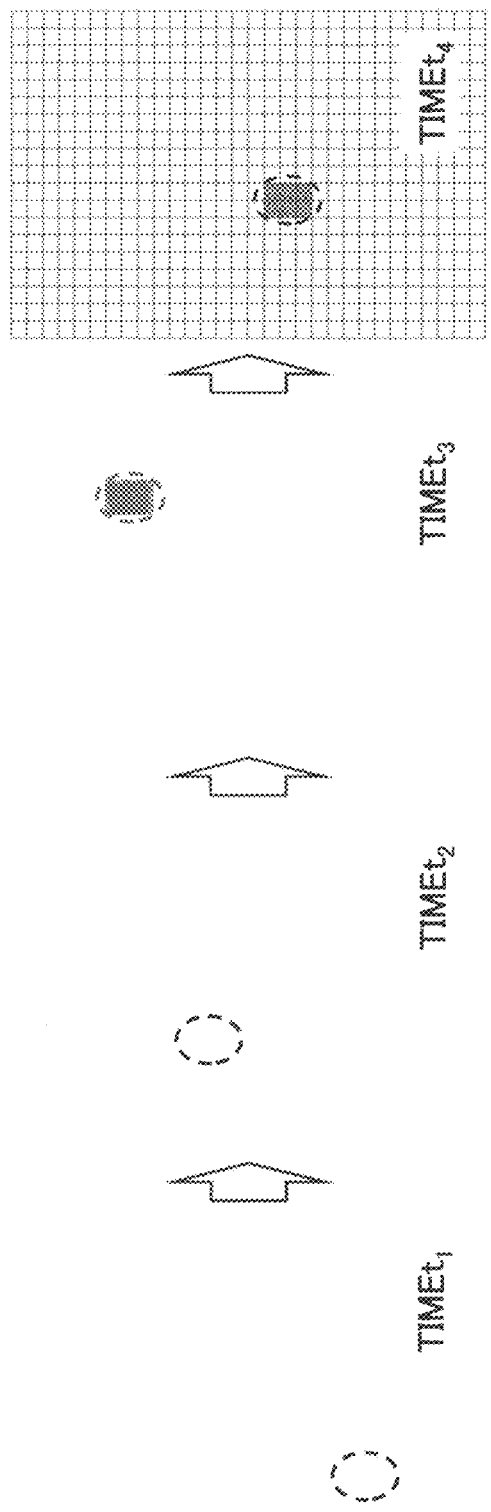
FIG. 11 is a schematic diagram illustrating still another example of a temporal change in the distribution of pressure applied to the pressure-sensitive sheet from which pressure data are acquired by the evacuation guidance system according to the first example embodiment of the present invention.

Herein, an example of determining a psychological state of a person on the pressure sensor 200 is described. FIGS. 9 to 11 are schematic diagrams for describing a temporal change in a pressure distribution acquired by the pressure-sensitive sheet 200. In FIGS. 9 to 11, pressure is applied to a filled-in pressure-sensitive unit. Note that, in FIGS. 9 to 11, it is assumed that the exit from the facility is located on the upper side of the drawings, and an evacuee needs to evacuate toward the upper side of the drawings in an emergency.

FIG. 9 indicates that an evacuee is moving toward the upper side of the facility from times $t_1$ to $t_4$. In other words, the evacuation guidance system 1 determines that the evacuee is moving toward the exit from the temporal change in the pressure data in FIG. 9, and determines that a psychological state of the person moving on the pressure-sensitive sheet 200 is normal.

FIG. 10 indicates that an evacuee is moving toward the lower side of the facility from times $t_1$ to $t_4$. In other words, the evacuation guidance system 1 determines that the evacuee is moving in a direction away from the exit from the temporal change in the pressure data in FIG. 10, and determines that a psychological state of the person moving on the pressure-sensitive sheet 200 is not normal.

FIG. 11 indicates that an evacuee is moving toward the lower side of the facility from times $t_1$ to $t_4$. In other words, the evacuation guidance system 1 determines that the evacuee is moving in confusion in the facility from the temporal change in the pressure data in FIG. 11, and determines that a psychological state of the person moving on the pressure-sensitive sheet 200 is not normal.

As described above, the evacuation guidance system according to the present example embodiment accurately determines states of an unspecified large number of people who are left behind in a facility in an emergency by using the pressure sensor installed on a surface of a floor in the facility, and determines a psychological state of each of the people from a temporal change in pressure data. As a result, the evacuation guidance system according to the present example embodiment can provide an appropriate evacuation instruction according to a psychological state of an evacuee and guide the evacuee to the outside of a facility safely, reliably, and rapidly.

Modification Example

Herein, a modification example of the evacuation guidance system 1 according to the present example embodiment is described.

Figure 12:
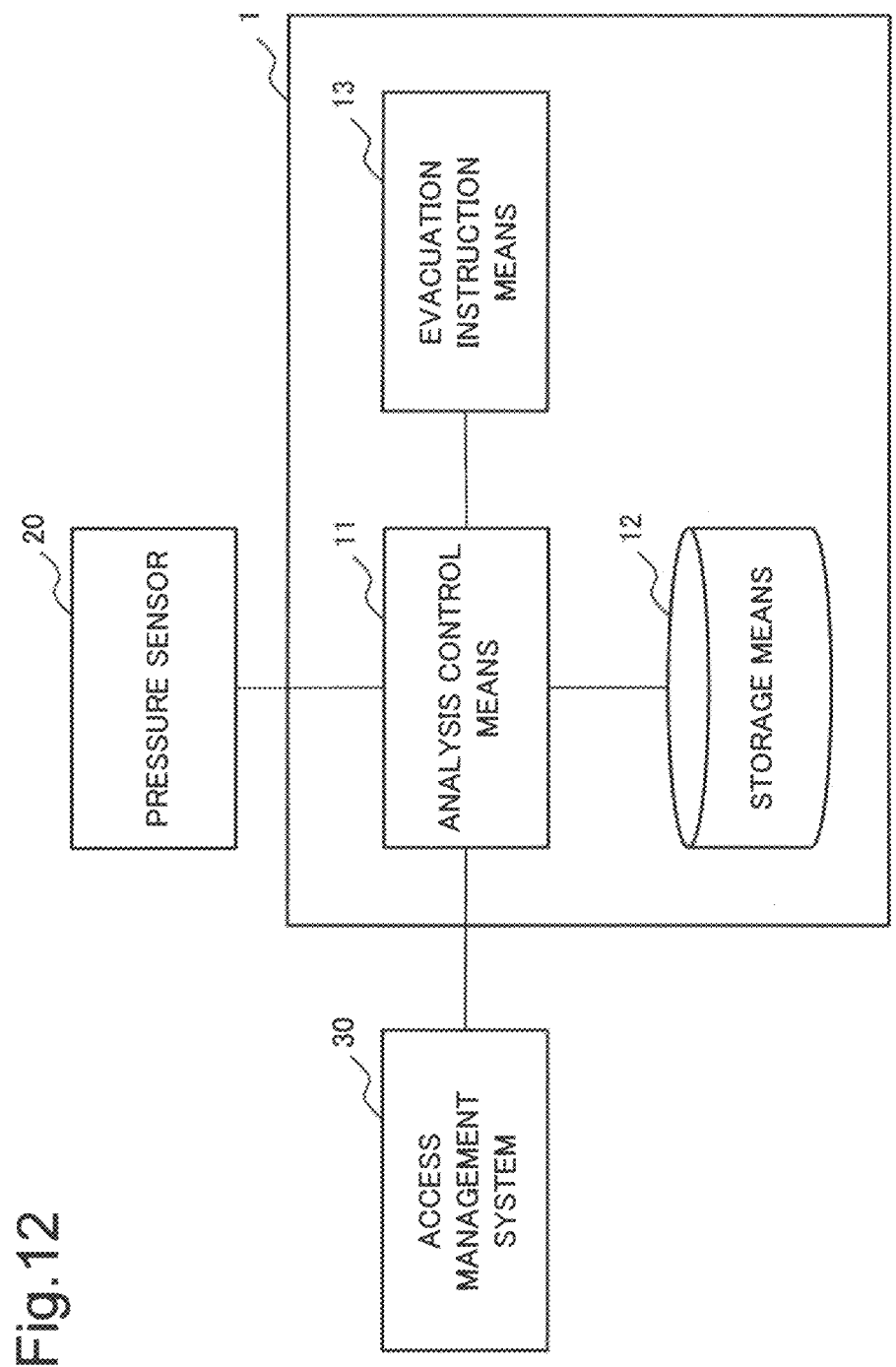
FIG. 12 is a block diagram illustrating a configuration in a modification example of the evacuation guidance system according to the first example embodiment of the present invention.

FIG. 12 is a modification example concerned with use of the evacuation guidance system 1 according to the present example embodiment. As in FIG. 12, an access management system 30 for managing access data to and from a facility is connected to the analysis control means 11 in the present modification example. The access management system 30 is able to use an existing system installed in a facility. One of requirements of the access management system 30 is to determine the number of evacuees who have left a facility to the outside. Accuracy of determining the number of evacuees is increased by always checking consistency between a change in number of evacuees in a facility acquired by the pressure sensor 20 and a number of people who have left the facility acquired from the access management system. Note that, the access management system 30 may be connected to a system according to each example embodiment described later.

Second Example Embodiment

Figure 13:
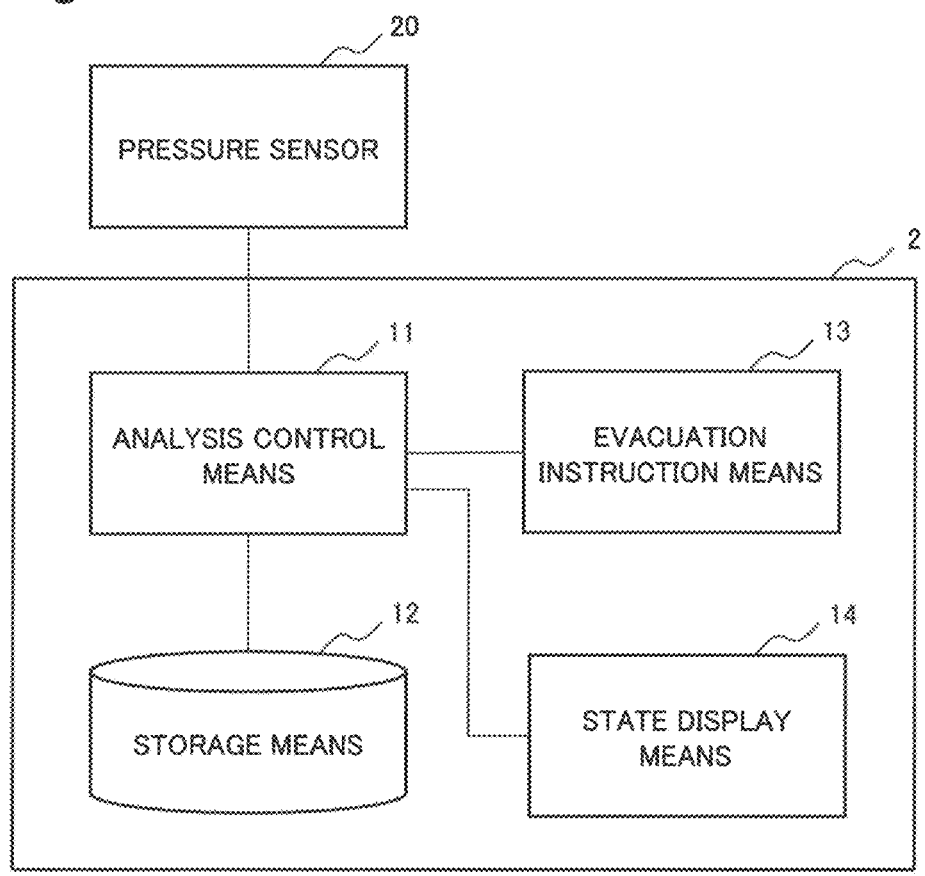
FIG. 13 is a block diagram illustrating a configuration of an evacuation guidance system according to a second example embodiment of the present invention.

Next, an evacuation guidance system 2 according to a second example embodiment of the present invention is described with reference to drawings. FIG. 13 is a block diagram illustrating a configuration of the evacuation guidance system 2 according to the present example embodiment.

As in FIG. 13, the evacuation guidance system 2 includes a state display means 14 in addition to an analysis control means 11, a storage means 12, and an evacuation instruction means 13 constituting the evacuation guidance system 1 in the first example embodiment.

The state display means 14 is connected to the analysis control means 11. Further, the state display means 14 is connected to a display device (not illustrated) such as a monitor installed in a security room and a management room.

The state display means 14 acquires information including an evacuation situation of an evacuee in a facility and an operation situation of the system and an analysis result from the analysis control means 11. The state display means 14 outputs, to the display device, the information including the evacuation situation of the evacuee in the facility and the operation situation of the system acquired from the analysis control means 11. Further, the state display means 14 outputs the analysis result by the analysis control means 11 to the display device. In other words, the state display means 14 causes an external display device (not illustrated) to display data including information about a state of a person moving on a pressure sensor 20 by using an analysis result of the analysis control means 11. A security guard and a manager who use the system can check an operation state of the entire system, an evacuation situation of an evacuee, and an analysis result of the analysis control means 11 from display data displayed on the display device.

Operation

Figure 14:
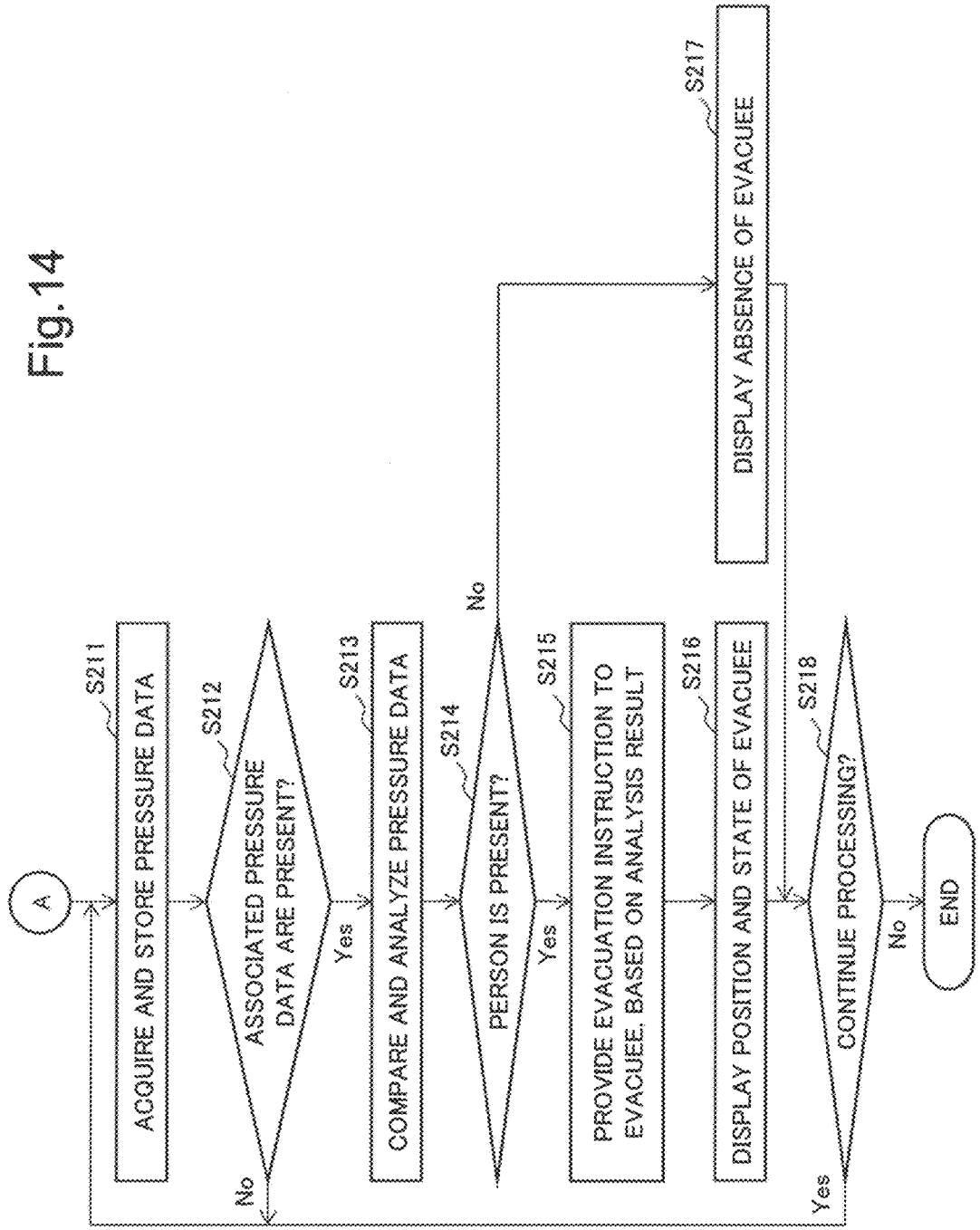
FIG. 14 is a flowchart for describing an operation of the evacuation guidance system according to the second example embodiment of the present invention.

Next, an operation of the evacuation guidance system 2 according to the present example embodiment is described by using a flowchart in FIG. 14. FIG. 14 is a flowchart concerned with an operation in an emergency. Note that, an operation of the evacuation guidance system 2 in a normal condition is processed along the flowchart in FIG. 2, similarly to the evacuation guidance system 1. The processing of the flowchart in FIG. 14 is performed when it is determined that the present time is in an emergency (Yes in Step S101) in Step S101 in the flowchart in FIG. 2.

In FIG. 14, the evacuation guidance system 2 first acquires pressure data output from the pressure sensor 20, and stores the acquired pressure data in the storage means 12 (Step S211).

Herein, the evacuation guidance system 2 determines presence or absence of pressure data associated with the stored pressure data (Step S212).

When the associated pressure data are present (Yes in Step S212), the evacuation guidance system 2 compares and analyzes the pieces of pressure data associated with each other. The pieces of pressure data associated with each other are pieces of pressure data acquired by the same pressure sensor 20 about pressure applied by the same subject in a verification time period. The evacuation guidance system 2 regards, as pieces of pressure data associated with each other, pieces of pressure data, based on pressure applied by a subject considered to have weight identical to weight calculated from a pressure value acquired by the pressure sensor 20 in a verification time period. On the other hand, when the associated pressure data are not present (No in Step S212), the processing returns to Step S111.

Herein, the evacuation guidance system 2 determines presence or absence of a person on the pressure sensor 20 (Step S214).

When the evacuation guidance system 2 determines that a person is present on the pressure sensor 20 (Yes in Step S214), the evacuation guidance system 1 causes the evacuation instruction means 13 to output evacuation instruction information for the person, based on an analysis result (Step S215).

Then, the evacuation guidance system 2 causes the state display means 14 to display the number of evacuees and a detailed position and a state of each of the evacuees on a display device, which is not illustrated (Step S216).

On the other hand, when the evacuation guidance system 2 determines that a person is not present on the pressure sensor 20 (No in Step S214), the evacuation guidance system 2 causes the state display means 14 to display absence of an evacuee on a display device, which is not illustrated (Step S217). Then, the processing proceeds to Step S218.

When the processing continues (Yes in Step S218), the processing returns to Step S211. When the processing is terminated (No in Step S218), the processing along the flowchart in FIG. 14 is terminated.

The operation of the evacuation guidance system 2 according to the present example embodiment is described above. Note that, the operation based on the flowchart in FIG. 14 is one example, and does not limit the scope of the present invention.

Figure 15:
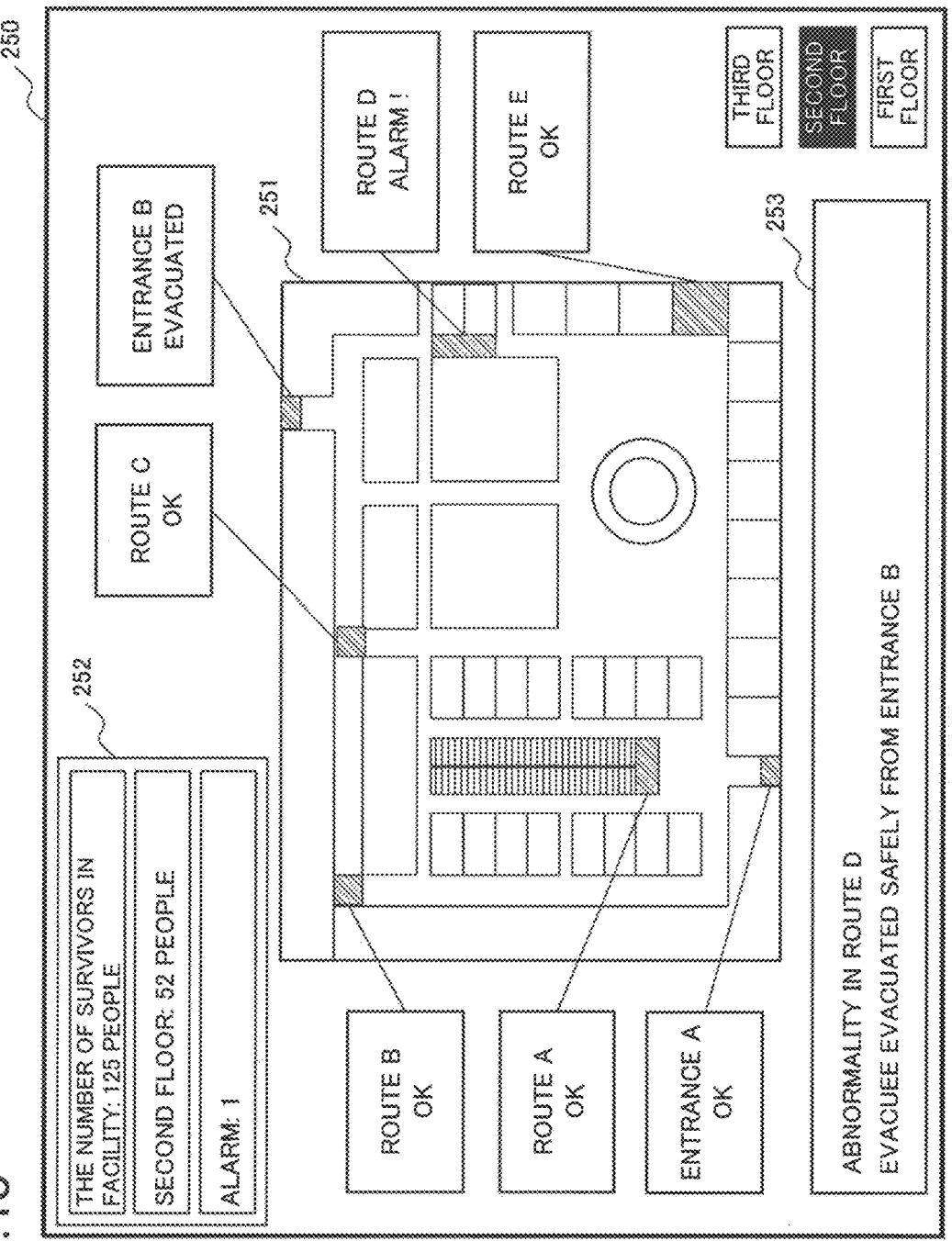
FIG. 15 is one example of displaying, on a monitor, information output by a situation display means of the evacuation guidance system according to the second example embodiment of the present invention.

Herein, an example of displaying information output from the state display means 14 is described. FIG. 15 is one example of displaying an evacuation situation of an evacuee and an analysis result on a monitor 250 of the display device. A situation where evacuees are left behind in a 3-story facility is assumed in FIG. 15.

A floor display section 251, an evacuation situation display section 252, an alarm display section 253, and the like are displayed on the monitor 250 in FIG. 15. In the floor display section 251, a place where the pressure-sensitive sheet 200 is disposed is indicated by oblique lines, and a detection situation of each of the pressure-sensitive sheets 200 is indicated by a pop-up. In the example of FIG. 15, an abnormality is detected by the pressure-sensitive sheet 200 set in front of a rest room. The evacuation situation display section 252 displays the number of survivors in the facility, the number of survivors on a second floor, and the number of alarms. Then, the alarm display section 253 displays a comment indicating that an abnormality occurs in a route D and a comment indicating that an evacuee has evacuated safely from an entrance B.

A manager of the facility can find out an evacuation situation and an analysis result by checking the information displayed on the monitor 250.

As described above, the evacuation guidance system according to the present example embodiment is able to notify a security guard and a manager of a situation of an evacuee in a facility and an analysis result of the system in addition to the effect of the first example embodiment.

Third Example Embodiment

Figure 16:
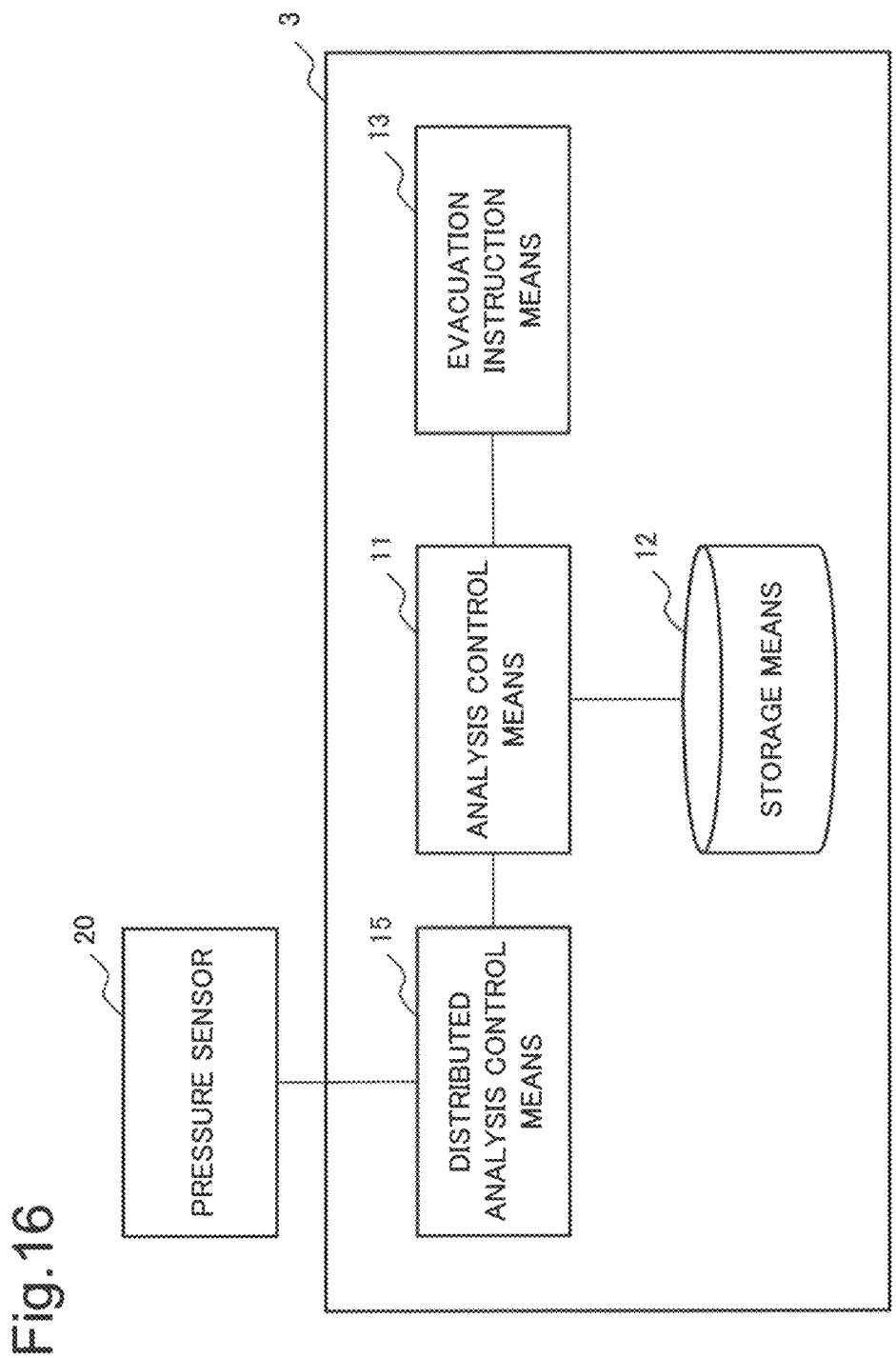
FIG. 16 is a block diagram illustrating a configuration of an evacuation guidance system according to a third example embodiment of the present invention.

Next, an evacuation guidance system according to a third example embodiment of the present invention is described with reference to drawings. FIG. 16 is a block diagram illustrating a configuration of an evacuation guidance system 3 according to the present example embodiment.

As in FIG. 16, the evacuation guidance system 3 in the present example embodiment includes a distributed analysis control means 15 in addition to an analysis control means 11, a storage means 12, and an evacuation instruction means 13 constituting the evacuation guidance system 1 in the first example embodiment. Note that, the distributed analysis control means 15 may be added to the evacuation guidance system 2 in the second example embodiment.

The distributed analysis control means 15 is installed near a pressure sensor 20 and the evacuation instruction means 13. The distributed analysis control means 15 determines a psychological state of a person located on the pressure sensor 20 from a temporal change in pressure data, similarly to the analysis control means 11. The distributed analysis control means 15 analyzes a pressure pattern output from the pressure sensor 20 on the spot, causes the evacuation instruction means 13 to display evacuation instruction information according to a situation, and rapidly provides information needed for an evacuee. The distributed analysis control means 15 communicates with the analysis control means 11 as necessary.

The distributed analysis control means 15 is provided according to the number of pressure sensors 20. The distributed analysis control means 15 is disposed near a place where the pressure sensor 20 is installed, and analyzes pressure data in a distributed manner for each pressure sensor 20. An application example of the distributed analysis control means 15 is described later.

As described above, the evacuation guidance system 3 in the present example embodiment enables distributed processing for each pressure-sensitive sheet 200 in addition to the effect of the first example embodiment. Note that, the system to which a concentrated control method of controlling in a concentrated manner by the analysis control means 11 is applied is described in the present example embodiment, but a distributed autonomous system may be formed of only the distributed analysis control means 15 without the analysis control means 11.

Application Example

Figure 17:
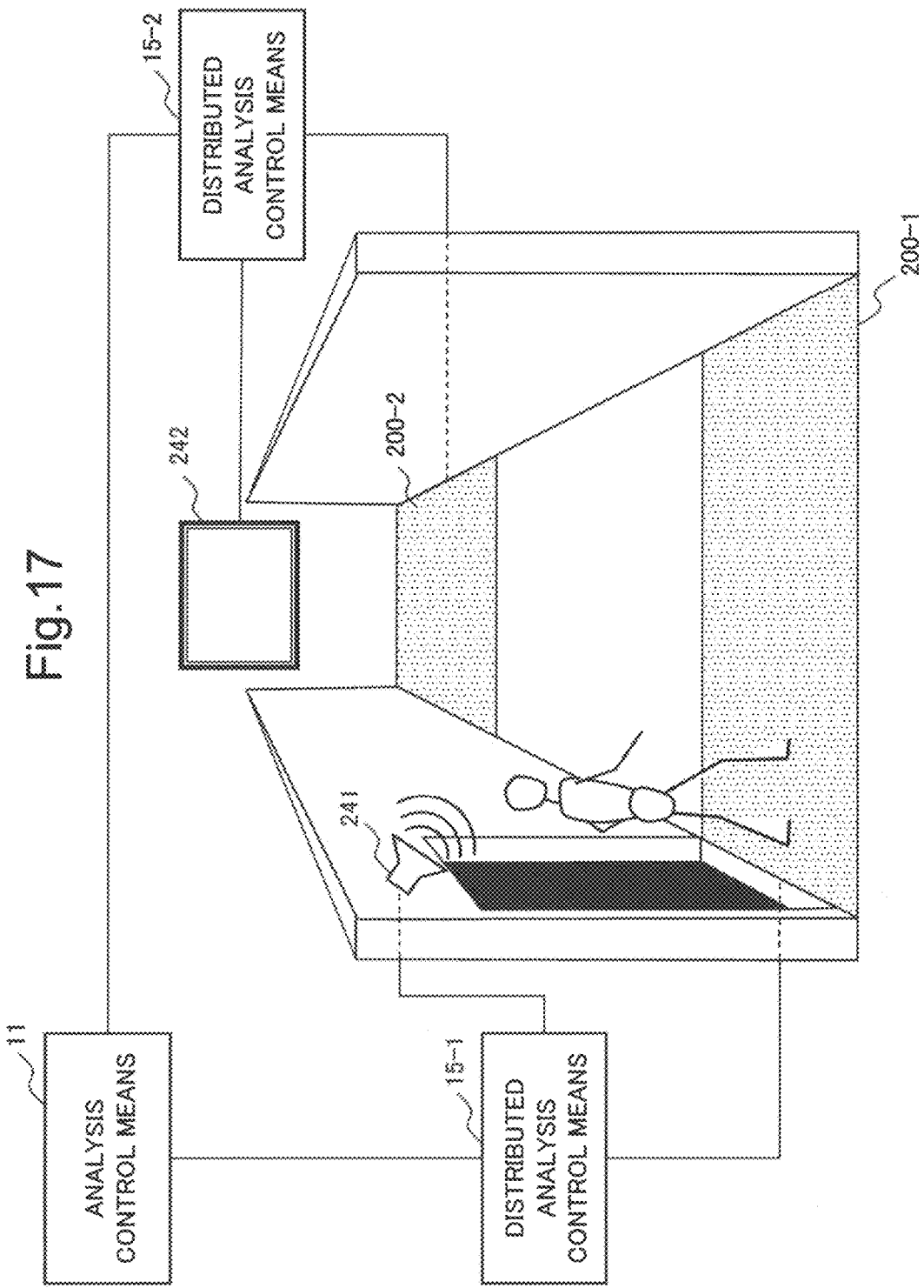
FIG. 17 is an application example of the evacuation guidance system according to the third example embodiment of the present invention.
Figure 18:
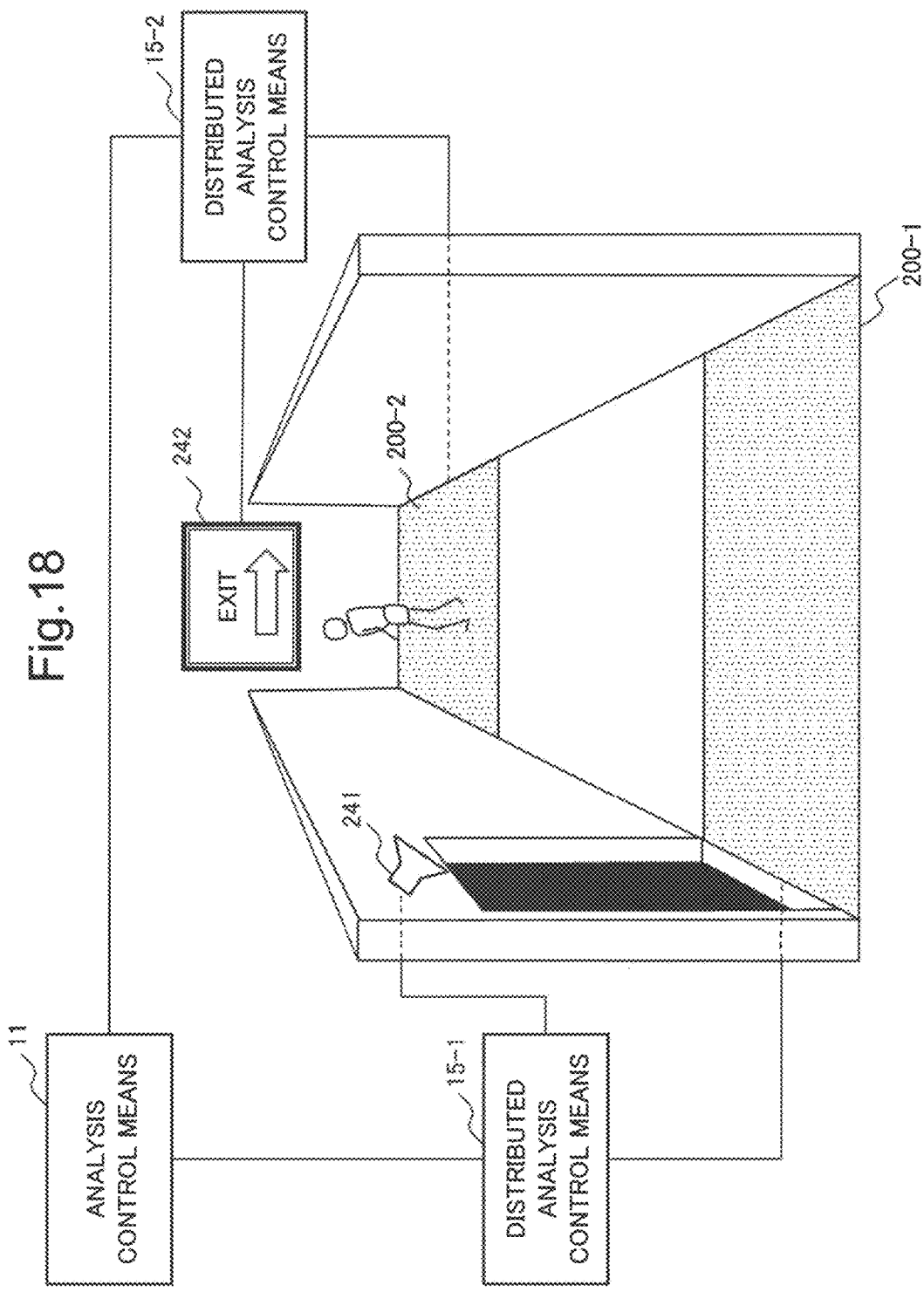
FIG. 18 is an application example of the evacuation guidance system according to the third example embodiment of the present invention.

Herein, an application example of the evacuation guidance system 3 according to the third example embodiment is illustrated. FIGS. 17 and 18 are application examples of disposing a plurality of pressure-sensitive sheets 200 on an evacuation route in a facility. Note that, the following description of FIGS. 17 and 18 may be regarded as an application example of the first and second example embodiments when a pressure pattern generated by the pressure-sensitive sheet 200 is output to the analysis control means 11 by bypassing the distributed analysis control means 15.

In the application examples of FIGS. 17 and 18, a pressure-sensitive sheet 200-1 is disposed on a floor near an entrance in a left wall of a passage, and a speaker 241 that outputs voice information including evacuation instruction information is installed near the pressure-sensitive sheet 200-1. Then, a distributed analysis control means 15-1 is installed near the pressure-sensitive sheet 200-1. Further, in the examples of FIGS. 17 and 18, a pressure-sensitive sheet 200-2 is disposed on the floor near the end of the passage, and a display device 242 that displays display information including evacuation instruction information is installed at the end of the passage. Then, a distributed analysis control means 15-2 is installed near the pressure-sensitive sheet 200-2.

FIG. 17 illustrates a state where a person is located on the pressure-sensitive sheet 200-1. In the example of FIG. 17, when the person is detected by the pressure-sensitive sheet 200-1, the distributed analysis control means 15-1 installed near the pressure-sensitive sheet 200-1 generates evacuation instruction information according to a psychological state of the person. The distributed analysis control means 15-1 outputs the generated evacuation instruction information to the speaker 241, and an appropriate evacuation instruction is provided from the speaker 241.

FIG. 18 illustrates a state where a person is located on the pressure-sensitive sheet 200-2. In the example of FIG. 18, when the person is detected by the pressure-sensitive sheet 200-2, the distributed analysis control means 15-2 installed near the pressure-sensitive sheet 200-2 generates evacuation instruction information according to a psychological state of the person. The distributed analysis control means 15-2 outputs the generated evacuation instruction information to the display device 242, and causes the display device 242 to display an appropriate evacuation instruction.

The evacuation instruction means 13 transmits evacuation instruction information according to a state of an evacuee to the speaker 241 and the display device 242 in an emergency.

In an emergency, voice information about an appropriate evacuation instruction according to a state of an evacuee is provided from the speaker 241. In particular, voice information according to a psychological state of an evacuee detected by the pressure-sensitive sheet 200-1 may be provided from the speaker 241. For example, information about a direction, a distance, and the like to the exit may be provided from the speaker 241. Further, sound for stabilizing a mental state of an evacuee may be provided from the speaker 241. Note that, voice information that guides a user using a facility to an appropriate place may be provided from the speaker 241 in a normal condition.

Further, in an emergency, an appropriate evacuation instruction according to a state of an evacuee is displayed on the display device 242. In particular, display information according to a psychological state of an evacuee detected by the pressure-sensitive sheet 200-2 may be displayed on the display device 242. For example, a direction, distance, and the like to the exit may be displayed on the display device 242. An evacuee checks an evacuation instruction generated according to a state of the evacuee on the display device 242, and is guided to the outside of the facility by responding to the checked evacuation instruction. Note that, display information that guides a user of a facility to an appropriate place may be displayed on the display device 242 in a normal condition.

As described above, according to the present application example, a state of an evacuee in a facility can be detected, and an appropriate evacuation instruction according to the state of the evacuee can be provided.

Fourth Example Embodiment

Figure 19:
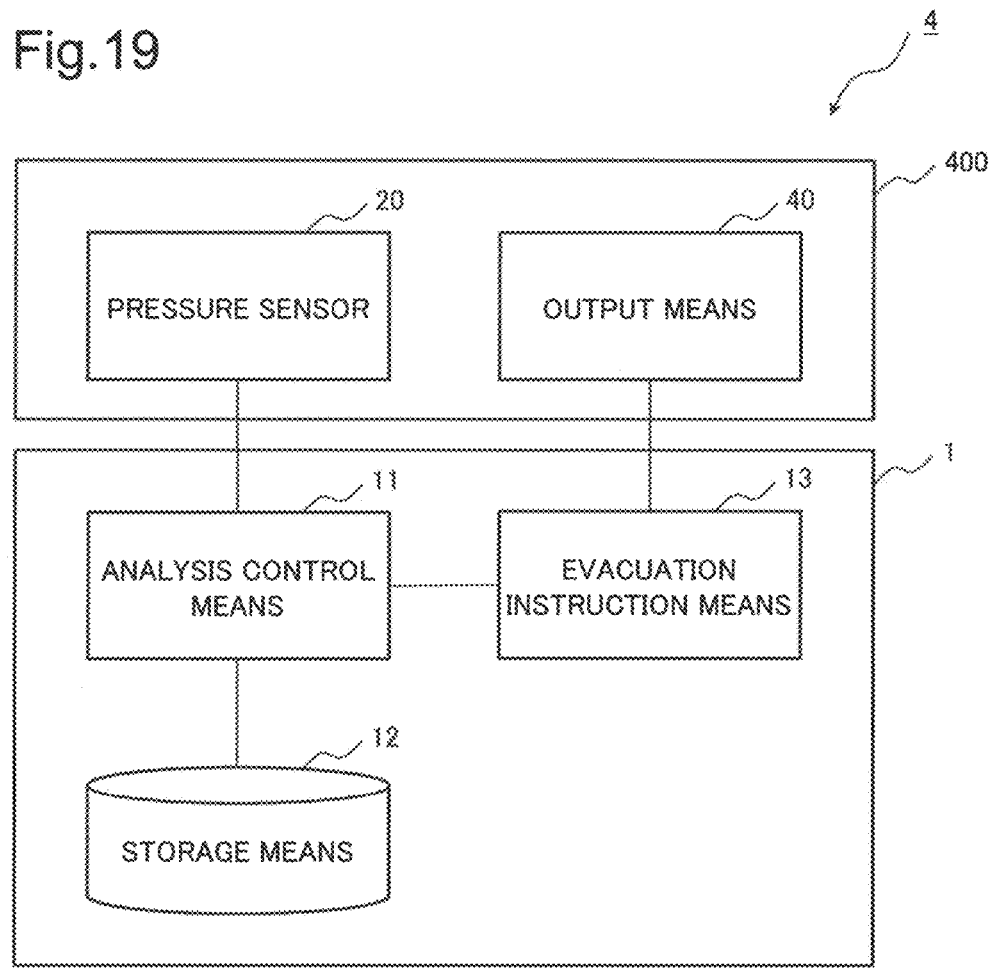
FIG. 19 is a block diagram illustrating a configuration of an evacuation guidance system according to a fourth example embodiment of the present invention.

Next, an evacuation guidance system according to a fourth example embodiment of the present invention is described with reference to drawings. FIG. 19 is a block diagram illustrating a configuration of an evacuation guidance system 4 according to the present example embodiment.

As in FIG. 19, the evacuation guidance system 4 has a structure in which an input-output device 400 is connected to the evacuation guidance system 1 in the first example embodiment. The input-output device 400 includes a pressure sensor 20 and an output means 40.

The input-output device 400 inputs pressure data by the pressure sensor 20, and also outputs, by the output means 40, evacuation instruction information generated by an evacuation instruction means 13, based on the input pressure data. It is assumed in the present example embodiment that a display is used as the output means 40. For example, the input-output device 400 can be achieved by a configuration such as a touch panel including a pressure-sensitive sheet in a sheet form and a display integrated together.

For example, the input-output device 400 can be formed by disposing a display under a transparent pressure-sensitive sheet. Further, the input-output device 400 can be formed by disposing a pressure-sensitive sheet under a transparent display. Further, the input-output device 400 may be formed by forming a pressure-sensitive element constituting a pressure-sensitive sheet and a display element in the same element. For example, the pressure-sensitive element and the display element can be integrally formed in the same sheet by a printing electronics technique.

Figure 20:
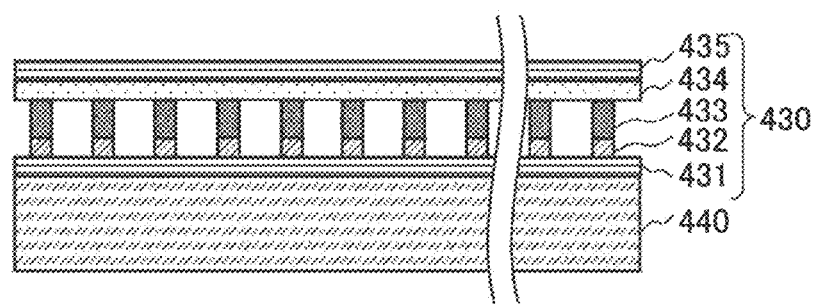
FIG. 20 is a schematic diagram illustrating a configuration example of a pressure-sensitive element included in a pressure-sensitive sheet used in the evacuation guidance system according to the fourth example embodiment of the present invention.

FIG. 20 is a cross-sectional view of an input-output device 410 including a display 440 disposed under a transparent pressure-sensitive sheet 430. The input-output device 410 includes a first substrate 431, a first electrode 432, a pressure-sensitive layer 433, a second electrode 434, and a second substrate 435. The first substrate 431, the first electrode 432, the pressure-sensitive layer 433, the second electrode 434, and the second substrate 435 included in the input-output device 410 respectively correspond to the first substrate 211, the first electrode 219, the pressure-sensitive layer 220, the second electrode 221, and the second substrate 222 in the pressure-sensitive element 210 in FIG. 5.

The first substrate 431, the first electrode 432, the second electrode 434, and the second substrate 435 are formed of a transparent material. Further, while the pressure-sensitive layer 433 is preferably transparent, the pressure-sensitive layer 433 may be formed to be thin in such a way that display information displayed on the display 440 can be visually recognized through the pressure-sensitive sheet 430.

Figure 21:
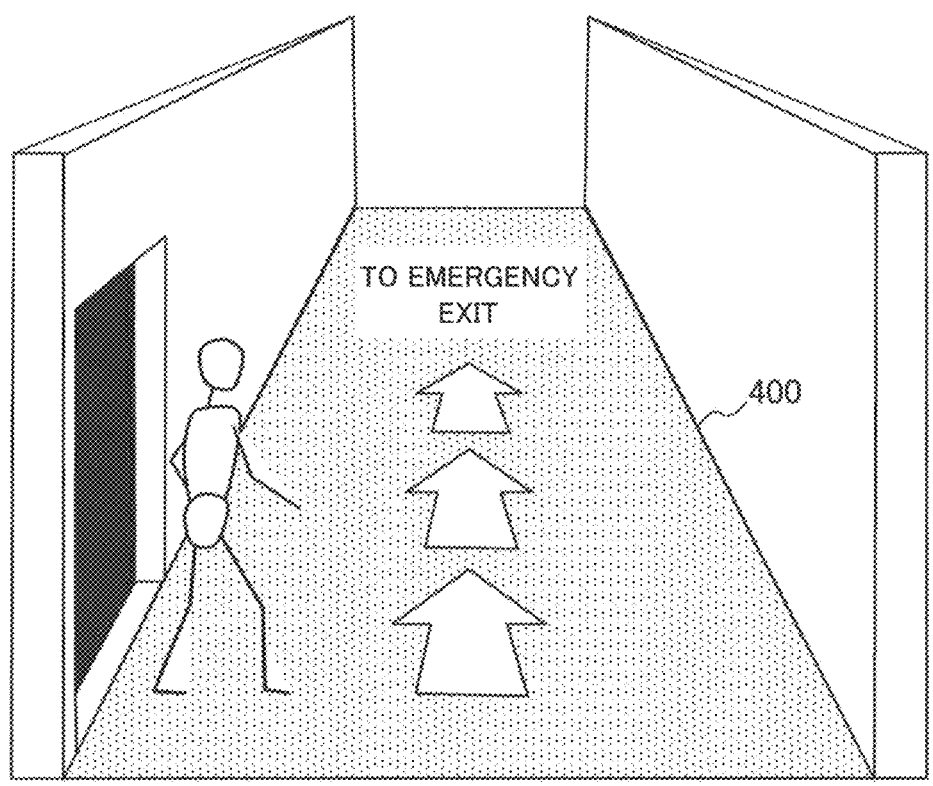
FIG. 21 is an application example of the evacuation guidance system according to the fourth example embodiment of the present invention.

FIG. 21 is an example of installing the input-output device 400 in the present example embodiment on a floor. The example of FIG. 21 is an example of detecting an evacuee located on the input-output device 400 and displaying evacuation instruction information on the input-output device 400.

As in FIG. 21, according to the present example embodiment, an evacuee can immediately check evacuation instruction information according to a psychological state of the evacuee detected by the input-output device 400 at feet of the evacuee, and thus the evacuee can appropriately evacuate. Further, at occurrence of a fire, it is difficult to check evacuation instruction information displayed above since smoke envelops a room, but the input-output device 400 in the present example embodiment displays evacuation instruction information at feet, and thus visual recognition by an evacuee is improved.

Hardware

Figure 22:
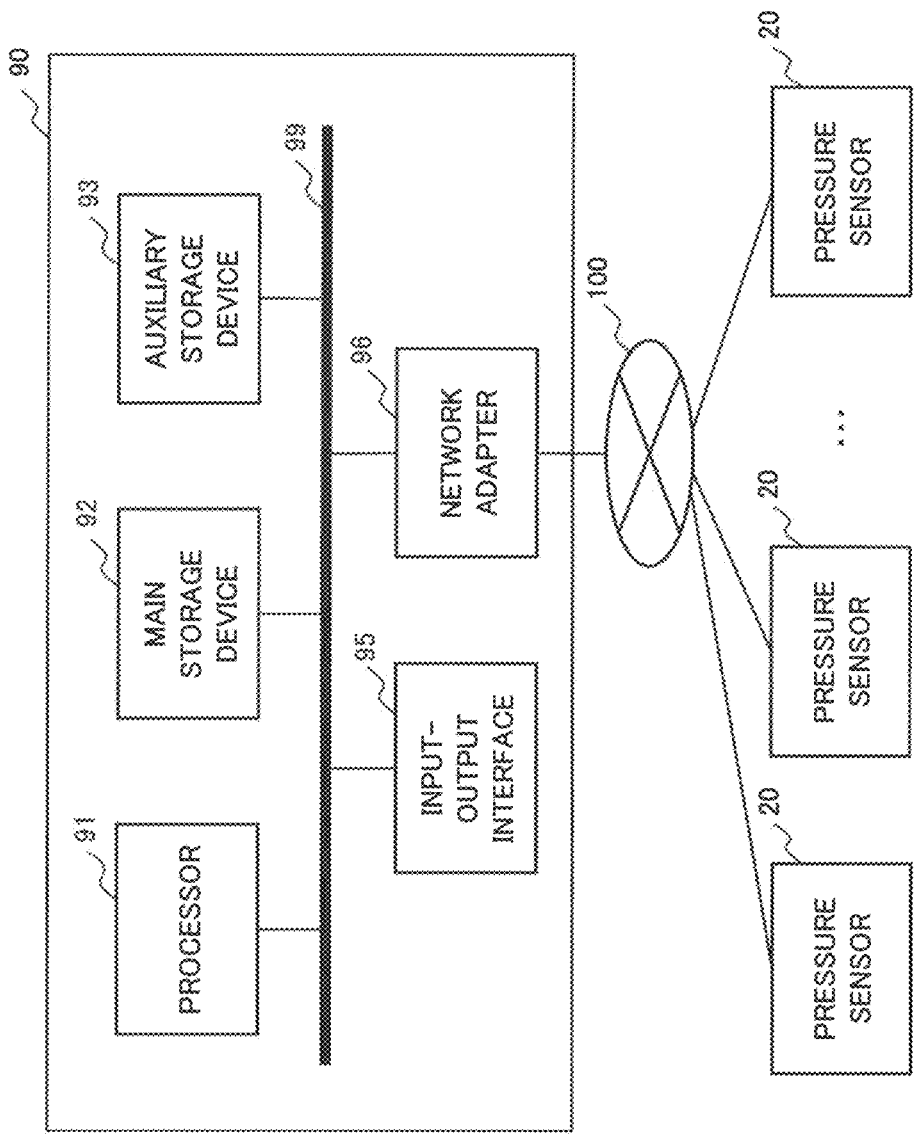
FIG. 22 is a schematic diagram of a hardware configuration for achieving the evacuation guidance system according to each of the example embodiments of the present invention.

Herein, hardware 90 for achieving an evaluation device according to the example embodiments of the present invention is described by using FIG. 22. Note that, the hardware 90 is one example for achieving the evacuation guidance system in the present example embodiment, and does not limit the scope of the present invention.

As in FIG. 22, the hardware 90 includes a processor 91, a main storage device 92, an auxiliary storage device 93, an input-output interface 95, and a network adapter 96. The processor 91, the main storage device 92, the auxiliary storage device 93, the input-output interface 95, and the network adapter 96 are connected to one another via a bus 99. Further, the processor 91, the main storage device 92, the auxiliary storage device 93, and the input-output interface 95 are connected to a network 100 such as an intranet and the Internet via the network adapter 96. Further, the hardware 90 is connected to at least one pressure sensor 20, a different system, and a different device via the network 100. Note that, each of the structural elements of the hardware 90 may include a single structural element or a plurality of structural elements.

The processor 91 is a central processing unit that develops a program stored in the auxiliary storage device 93 and the like in the main storage device 92, and executes the developed program. In the present example embodiment, the processor 91 may be configured to use a software program installed in the hardware 90. The processor 91 executes various arithmetic processing and control processing.

The main storage device 92 has a region in which a program is developed. The main storage device 92 may be a volatile memory such as a dynamic random access memory (DRAM), for example. Further, a non-volatile memory such as a magnetoresistive random access memory (MRAM) may be formed and added as the main storage device 92.

The auxiliary storage device 93 is a storage device for storing various data. The auxiliary storage device 93 is formed as a local disc such as a hard disc and a flash memory. Note that, the main storage device 92 may be configured to store data, and the auxiliary storage device 93 may be omitted.

The input-output interface 95 is an interface (I/F) that connects the hardware 90 and a peripheral apparatus, based on connection standards.

An input apparatus, such as a keyboard, a mouse, and a touch panel, and an output apparatus, such as a display and a printing apparatus, may be connected to the hardware 90 as necessary. These input apparatus and output apparatus are used to input information and setting. Giving and receiving of data between the processor 91 and the input apparatus may be intervened by the input-output interface 95.

The network adapter 96 is an interface for connection with the network 100, based on a standard and a specification. The input-output interface 95 and the network adapter 96 may be standardized as an interface for connection with an external apparatus.

Further, a reader/writer may be equipped in the hardware 90 as necessary. The reader/writer is connected to the bus 99. The reader/writer intervenes between the processor 91 and a recording medium (program recording medium), which is not illustrated, in reading of data and a program from the recording medium, writing of a processing result of the hardware 90 to the recording medium, and the like. The recording medium may be achieved by a semiconductor recording medium such as a secure digital (SD) card and a universal serial bus (USB) memory, for example. Further, the recording medium may be achieved by a magnetic recording medium such as a flexible disc, an optical recording medium such as a compact disc (CD) and a digital versatile disc (DVD), and another recording medium.

One example of the hardware for achieving the evacuation guidance system according to the example embodiments of the present invention is described above. The structural element of each of the example embodiments in the present invention may be achieved as a circuit including at least any of the structural elements of the hardware in FIG. 22. Further, the structural element of each of the example embodiments in the present invention may be achieved as software operating on a computer having a configuration of the hardware in FIG. 22.

The hardware configuration in FIG. 22 is one example of a hardware configuration that enables the evacuation guidance system in the present example embodiment, and does not limit the scope of the present invention. Further, a program that causes a computer to execute processing by the evacuation guidance system in the present example embodiment is also included in the scope of the present invention. Furthermore, a program recording medium that stores a program according to the example embodiments in the present invention is also included in the scope of the present invention.

The evacuation guidance system according to each of the example embodiments in the present invention may be used for a purpose other than an evacuation guide at occurrence of a disaster. For example, the evacuation guidance system according to each of the example embodiments may be used for detecting a lost child in a commercial facility and guiding a lost child safely. Further, the evacuation guidance system according to each of the example embodiments may be used for detecting an unusual change in a user and guiding a user to an appropriate destination in a facility where a user such as an elder person and a sick person lives. Further, the evacuation guidance system according to each of the example embodiments may be used for detecting a suspicious person who takes a suspicious action in a public institution such as an airport and a railway and calling attention to a suspicious person. Note that, a use of the evacuation guidance system according to each of the example embodiments is not limited to the above-described uses as long as the evacuation guidance system is used for determining a state of a person in an arbitrary facility and providing some sort of instruction to a subject that satisfies a specific condition, based on a determination result.

Although the present invention has been described with reference to the example embodiments, the present invention is not limited to the above-described example embodiments. Various modifications that can be understood by those skilled in the art within the scope of the present invention may be applied to the configuration and the details of the present invention.

This application is based upon and claims the benefit of priority from Japanese Patent Application No. 2016-152623, filed on Aug. 3, 2016, the disclosure of which is incorporated herein in its entirety by reference.

REFERENCE SIGNS LIST 1, 2, 3 Evacuation guidance system
11 Analysis control means
12 Storage means
13 Evacuation instruction means
14 State display means
15 Distributed analysis control means
20 Pressure sensor
30 Access management system
200 Pressure-sensitive sheet
201 Matrix circuit
210 Pressure-sensitive element
211 First substrate
212 Gate electrode
213 Gate oxide film
214 Source electrode
215 Drain electrode
216 Channel layer
217 Intermediate layer
218 Via
219 First electrode
220 Pressure-sensitive layer
221 Second electrode
222 Second substrate

The invention claimed is:

1. An evacuation guidance system comprising:
a storage circuit;
an analysis control circuit configured to acquire pressure data generated by at least one pressure sensor installed on an evacuation route in a facility and store the pressure data in the storage circuit, the analysis control circuit configured to compare a plurality of pieces of the pressure data generated in a verification time period to analyze a temporal change in the pressure data, and the analysis control circuit configured to analyze a state of a person located on the pressure sensor; and
an evacuation instruction circuit configured to generate evacuation instruction information based on an analysis result of the analysis control circuit.

2. The evacuation guidance system according to claim 1, wherein
the evacuation instruction circuit outputs the generated evacuation instruction information to an output device installed near the pressure sensor.

3. The evacuation guidance system according to claim 2, wherein
the pressure sensor is formed into a sheet form including a plurality of pressure-sensitive elements arranged in a grid pattern, generates a pressure pattern in which a pressure value measured by the pressure-sensitive element to which pressure is applied is patterned, and outputs the generated pressure pattern included in the pressure data, and
the analysis control circuit determines whether a person is located on the pressure sensor from a temporal change in a plurality of pieces of the pressure data generated in a verification time period, and, when determining that a person is located on the pressure sensor, analyzes a temporal change in the pressure pattern included in the pressure data, and determines a state of a person located on the pressure sensor.

4. The evacuation guidance system according to claim 3, wherein
the storage circuit stores pattern data in which a temporal change in the pressure pattern is associated with a psychological state of a person, and
the analysis control circuit specifies the pattern data associated with a temporal change in a plurality of pieces of the pressure data generated in a verification time period, and determines a psychological state of a person located on the pressure sensor.

5. The evacuation guidance system according to claim 2, further comprising
a state display circuit configured to cause an external display device to display data including an analysis result of the analysis control circuit.

6. The evacuation guidance system according to claim 2, further comprising a distributed analysis control circuit configured to generate the evacuation instruction information based on an analysis result of the analysis control circuit, and output the generated evacuation instruction information to the output device, the distributed analysis control circuit configured to be installed for each of the pressure sensor.

7. The evacuation guidance system according to claim 2, wherein
the analysis control circuit is connected to an access management system for managing access data to and from a facility, and analyzes an evacuation situation, based on the access data acquired from the access management system.

8. The evacuation guidance system according to claim 2, further comprising
the pressure sensor.

9. The evacuation guidance system according to claim 2, wherein
the pressure sensor is integrated with the output device.

10. An evacuation guidance method comprising:
acquiring pressure data, by an analysis control circuit, generated by at least one pressure sensor installed on an evacuation route in a facility, and storing the pressure data in a storage circuit;
comparing a plurality of pieces of the pressure data, by the analysis control circuit, generated in a verification time period, analyzing a temporal change in the pressure data, and analyzing a state of a person located on the pressure sensor; and
generating evacuation instruction information, by an evacuation instruction circuit, based on an analysis result.

* * * * *